United States Patent
Minamigata et al.

(10) Patent No.: US 8,523,228 B2
(45) Date of Patent: Sep. 3, 2013

(54) STEERING COLUMN SUPPORT APPARATUS

(75) Inventors: Takahiro Minamigata, Gunma (JP); Minao Umeda, Gunma (JP); Osamu Tatewaki, Gunma (JP); Kiyoshi Sadakata, Gunma (JP); Toru Segawa, Gunma (JP); Takeshi Fujiwara, Gunma (JP); Nobuyuki Nishimura, Gunma (JP)

(73) Assignee: NSK Ltd., Tokyo (JP)

( * ) Notice: Subject to any disclaimer, the term of this patent is extended or adjusted under 35 U.S.C. 154(b) by 26 days.

(21) Appl. No.: 13/379,539

(22) PCT Filed: Oct. 21, 2011

(86) PCT No.: PCT/JP2011/074344
§ 371 (c)(1),
(2), (4) Date: Feb. 14, 2012

(87) PCT Pub. No.: WO2012/066900
PCT Pub. Date: May 24, 2012

(65) Prior Publication Data
US 2012/0144951 A1 Jun. 14, 2012

(30) Foreign Application Priority Data

Nov. 15, 2010 (JP) .................................. 2010-254634
Nov. 29, 2010 (JP) .................................. 2010-264739
Apr. 12, 2011 (JP) .................................. 2011-088059

(51) Int. Cl.
*B62D 1/19* (2006.01)

(52) U.S. Cl.
USPC ............................. 280/777; 280/779; 74/492

(58) Field of Classification Search
USPC .................... 280/775, 777, 779, 780; 74/492
See application file for complete search history.

(56) References Cited

FOREIGN PATENT DOCUMENTS

| JP | 5138841 | 3/1976 |
|----|---------|--------|
| JP | 51119231 | 9/1976 |
| JP | 51121929 | 10/1976 |
| JP | 5241820 | 3/1977 |
| JP | 20006821 | 1/2000 |
| JP | 2005219641 | 8/2005 |
| JP | 200769821 | 3/2007 |
| JP | 2008100597 | 5/2008 |

*Primary Examiner* — Drew Brown
*Assistant Examiner* — Timothy Wilhelm
(74) *Attorney, Agent, or Firm* — Katten Muchin Rosenman LLP

(57) ABSTRACT

Provided is construction of a steering column support apparatus that simplifies tuning for stabilizing the forward displacement of the steering wheel during a secondary collision, makes the apparatus more compact and low cost, and lowers and stabilizes the break away load. A bracket 12b on the column and a locking capsule 53 that are both made of metal plate are connected and fastened together by welding. A pair of left and right eave sections 56 are formed on both the left and right end sections of the locking capsule 53 by way of raised sections 55. The portion of the metal plate of a bracket 11 on the vehicle side on both sides of a locking hole 45 fits between the bottom surfaces of the eave sections 56 and the top surface of the bracket 12b on the column side so as to be able to break away during a secondary collision.

7 Claims, 27 Drawing Sheets

(A)

(B)

(C)

STEERING COLUMN SUPPORT APPARATUS

TECHNICAL FIELD

The present invention relates to a steering column support apparatus that supports a steering column such that the steering column can displace in the forward direction with respect to the vehicle body while absorbing impact energy that is applied to the steering wheel from the body of the driver during a collision accident.

BACKGROUND ART

A steering apparatus for an automobile, as illustrated in FIG. 21, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. The steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that the shaft can transmit torque, and can contract along its entire length due to an impact load, so that when the steering gear unit 2 is displaced in the backward direction due to a primary collision between an automobile and another automobile, that displacement is absorbed, which prevents the steering wheel 1 from displacing in the backward direction via the steering shaft 5 and hitting the body of the driver.

In this kind of steering apparatus for an automobile, in order to protect the body of the driver, this kind of steering apparatus for an automobile requires construction that allows the steering wheel to displace in the forward direction while absorbing impact energy during a collision accident. In other words, after the primary collision in a collision accident, a secondary collision occurs when the body of the driver collides with the steering wheel 1. In order to protect the driver by lessening the impact applied to the body of the driver during this secondary collision, construction is known (refer to JP51-121929(U), JP2005-219641(A) and JP2000-6821 (A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 22 to FIG. 24 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 21) can be fastened to the portion on the rear end section of this steering shaft 5a that protrudes from the opening on the rear end of the steering column 6a. The steering column 6a and the housing 10 are supported by a flat bracket on the vehicle side (not illustrated in the figure) that is fastened to the vehicle body so that they can break away in the forward direction due to an impact load in the forward direction.

To accomplish this, a bracket 12 on the column side that is supported in the middle section of the steering column 6a and a support bracket 13 on the housing side that is supported by the housing 10 are supported with respect to the vehicle body so that they both can break away in the forward direction due to an impact load in the forward direction. These support brackets 12, 13 both comprise installation plate sections 14a, 14b at one or two locations, and cutout sections 15a, 15b are formed in these installation plate sections 14a, 14b so that they are open on the rear end edges. With these cutout sections 15a, 15b covered, sliding plates 16a, 16b are assembled in the portions of the support brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top and bottom plate section that are connected by connecting plate section. Through holes for inserting bolts or studs are formed in portions of the top and bottom plate sections that are aligned with each other. With these sliding plates 16a, 16b mounted on the installation plate sections 14a, 14b, the through holes are aligned with the cutout sections 15a, 15b that are formed in these installation plate sections 14a, 14b.

The bracket 12 on the column side and the bracket 13 on the housing side are supported by the fastening bracket 11 on the vehicle side by screwing nuts onto bolts or studs that are inserted through the cutout sections 15a, 15b in the installation plate sections 14a, 14b and the through holes in the sliding plates 16a, 16b, and tightening the nuts. During a secondary collision, the bolts or studs come out from the cutout sections 15a, 15b together with the sliding plates 16a, 16b, which allows the steering column 6a and the housing 10 to displace in the forward direction together with the brackets 12 on the column side, the bracket 13 on the housing side and the steering wheel 1.

In the example in the figures, energy absorbing members 17 are provided between these bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

As illustrated in FIG. 24, during a secondary collision, the bolts or studs come out from the cutout sections 15a, 15b allowing the bracket 12 on the column side to displace in the forward direction from the normal state illustrated in FIG. 23, and the steering column 6a displaces in the forward direction together with the bracket 12 on the column side. When this happens, the bracket 13 on the housing side as well breaks away from the vehicle body, allowing this bracket 13 on the housing side to displace in the forward direction. As the bracket 12 on the column side displaces in the forward direction, the energy absorbing members 17 plastically deform and absorb impact energy that is transmitted to the bracket 12 on the column side via the steering shaft 5a and the steering column 6a, lessening the impact applied to the body of the driver.

In the case of the construction illustrated in FIG. 22 to FIG. 24, the bracket 12 on the column side is supported by the bracket on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 25 to FIG. 27 illustrate the construction disclosed in this document. In the case of this construction, a locking notch 18 is formed in the center section in the width direction of a bracket 11a that is fastened to and supported by the vehicle body and that does not displace in the forward direction even during a secondary collision, and this locking notch 18 is open on the edge of the front end of the bracket 11 on the vehicle side. Moreover, a bracket 12a on the column side is such that it is able to displace in the forward direction together with a steering column 6b during a secondary collision.

Furthermore, both the left and right end sections of a locking capsule 19 that is fastened to this bracket 12a on the column side is locked in the locking notch 18. In other words, locking grooves 20 that are formed on both the left and right side surfaces of the locking capsule 19 engage with the edges on both the left and right sides of the locking notch 18. Therefore, the portions on both the left and right end sections of the locking capsule 19 that exist on the top side of the locking grooves 20 are positioned on the top side of bracket 11a on the vehicle side on both side sections of the locking notch 18. When the bracket 11a on the vehicle side and the locking capsule 19 are engaged by way of the locking grooves 20 and the edges on both sides of the locking notch 18, locking pins 22 are pressure fitted into small locking holes 21a, 21b that are formed in positions in these members 11a, 20 that are aligned with each other, joining the members 11a, 20 together. These locking pins 22 are made using a relatively soft material such as an aluminum alloy, synthetic resin or the like that will shear under an impact load that is applied during a secondary collision.

When an impact load is applied during a secondary collision from the steering column 6b to the locking capsule 19 by way of the bracket 12a on the column side, these locking pins 22 shear. The locking capsule 19 then comes out in the forward direction from the locking notch 18, which allows the steering column 6b to displace in the forward direction of the steering wheel 1 that is supported by this steering column 6b via the steering shaft.

In the case of the construction illustrated in FIG. 25 to FIG. 27, the engagement section between the locking capsule 19 that is fastened to the bracket 12a on the column side and the bracket 11 on the vehicle side is located at only one location in the center section in the width direction. Therefore, tuning for disengaging this engagement section and causing the steering wheel 1 to displace stably in the forward direction during a secondary collision becomes simple.

However, in the conventional construction, the shape of the bracket 11 on the vehicle side is special, so the construction of connecting and fastening this bracket 11a on the vehicle side to the vehicle body becomes complex, and the assembly height becomes high, therefore there is a problem in that design freedom of the steering apparatus is lost. Moreover, the number of parts increases, the work for processing parts, managing parts and assembling parts becomes troublesome, and the costs increase. Furthermore, the assembly height, for example, the distance from the center of the steering column 6b to the installation surface on the vehicle side becomes large, and there is a disadvantage in that performing design in order that the steering column 6b does not interfere with the knees of the driver becomes difficult. In addition, construction for preventing the steering column 6a from dropping excessively together with the steering wheel 1 when the locking capsule 19 breaks away completely from the bracket 11a on the vehicle side during a secondary collision is not considered.

Of the related literature disclosing technology related to a steering column support apparatus, JP2000-6821(A) discloses construction wherein, in order to lessen the impact applied to the body of the driver that collides with the steering wheel during a secondary collision, an energy absorbing member that plastically deforms as the steering wheel and steering column displace in the forward direction is used. Moreover, in JP2007-69821(A) and JP2008-100597(A), construction is disclosed wherein, in order to increase the holding force for keeping the steering wheel in an adjusted position, a plurality of overlapping friction plates are used to increase the friction surface area. However, none of these documents discloses technology for keeping the load required for the locking capsule, which is supported by the steering column, to come out in the forward direction from the locking notch, which is formed in the bracket on the vehicle side, low.

RELATED LITERATURE

Patent Literature

| [Patent Literature 1] | JP51-121929(U) |
| [Patent Literature 2] | JP2005-219641(A) |
| [Patent Literature 3] | JP2000-6821(A) |
| [Patent Literature 4] | JP2007-69821(A) |
| [Patent Literature 5] | JP2008-100597(A) |

SUMMARY OF THE INVENTION

Problem to be Solved by the Invention

In consideration of the situation above, the object of the present invention is to provide construction of a steering column support apparatus that simplifies tuning for stabilizing forward displacement of the steering wheel during a secondary collision, makes the apparatus more compact and low cost, and maintains design freedom.

Means for Solving the Problems

The steering column support apparatus of the present invention comprises:

a bracket on the vehicle side having a locking hole that extends in the axial direction of a steering column and that is located in the center section in the width direction of the bracket, this bracket on the vehicle side being fastened to the vehicle so as not to displace in the forward direction during a secondary collision;

a bracket on the column side that is supported by the steering column and comprises a top plate section on the top end section thereof; and a locking capsule that is fastened to the bracket on the column side and is locked in the locking hole of the bracket on the vehicle side, the bracket on the column side being supported by the bracket on the vehicle side by way of the locking capsule so as to be able to break away in the forward direction due to an impact load that is applied during a secondary collision.

Particularly, in the steering column support apparatus of the present invention, the bracket on the column side and the locking capsule are both made of metal plate that can be welded. The locking capsule comprises a base plate section, at least a pair of left and right raised sections, and at least a pair of left and right eave sections. Of these, the base plate section is fastened and welded to a top surface of the top plate section of the bracket on the column side with this base plate overlapping with the top plate section. Moreover, the pair of raised sections are bent and extend upward from both end sections in the width direction of the base plate section. Furthermore, the pair of eave sections are bent and extend in opposite directions from each other from the top ends of the raised sections. And, the portion of the bracket on the vehicle side on both sides of the locking hole fits between the top surface of the bracket on the column side and the bottom surface of the eave sections.

Preferably, the dimension in the forward/backward direction of the base plate section is equal to or less than the dimension in the forward/backward direction of the portion of the top plate section of the bracket on the column side that overlaps with the base plate section. And the end edges in the forward/backward direction of the base plate and the top surface or the end edges in the forward/backward direction of the top plate section are joined by fillet welding.

Alternatively, bent back sections, which are formed by bending back the end sections in the forward/backward direction of the base plate section, wrap around the end sections in the forward/backward direction of the portions of the top plate section of the bracket on the column side that overlap with the base plate section. The locking capsule is fastened to the bracket on the column side by engaging these bent back sections with the end sections in the forward/backward direction of the top plate section in addition to welding together the top plate section and the base plate section.

Furthermore, preferably, a through hole is formed in a portion of the base plate section. And at least part of the inner peripheral edge of the through hole and the top surface of the top plate section are joined by welding.

Preferably, when embodying the present invention as described above, the length in the forward/backward direction of the locking hole is longer than the length in the same direction of the locking capsule. More specifically, the length in the forward/backward direction of the locking hole is long enough that even when the locking capsule has displaced together with the steering column in the forward direction during a secondary collision, at least the rear end sections of the eave sections of the locking capsule are located on the top side of the front end section of the bracket on the vehicle side, making it possible to prevent the locking capsule from dropping down.

Moreover, in the present invention, preferably a plurality of small through holes are formed in portions of the bracket on the vehicle side on both sides of the locking hole, and in portions of the eave sections of the locking capsule that are aligned with each other; connecting pins made of synthetic resin are formed by performing injection molding of injecting molten resin in the aligned small through holes such that these connecting pins span between these small through holes; and together with the locking capsule being connected to the bracket on the vehicle side by the connecting pins, part of the synthetic resin of the connecting pins penetrates into at least part of a space that exists between the top and bottom surfaces of the bracket on the vehicle side and the opposing surfaces to these surfaces, preventing vibration in the space between these surfaces.

In this case, preferably, the break away load required for causing the locking capsule and the bracket on the column side to displace in the forward direction during a secondary collision is prevented from becoming large or unstable by making the shape of the continuous sections between both end sections on the bottom surface of the base plate section and the bottom end sections on the outside surfaces of the raised sections in the locking capsule be a pointed shape. In order for this kind of construction, in the process of manufacturing the locking capsule, first, a metal plate raw material is bent at two locations in the middle section thereof to obtain a first intermediate raw material comprising a base plate that is formed in the middle section, and a pair of bent plate sections that are bent at right angles in the direction of the thickness of the raw material from both the left and right end sections of the base plate section, with the continuous sections between the outside surfaces of these bent plate sections and the bottom surface of base plate sections being convex curved surfaces having arc shaped cross sections. After that, the portions near both ends of the base plate section are pressed in the thickness direction, causing the metal material of these portions to flow into the portions of the convex curved surfaces, making the shape of the continuous sections between the outside surfaces of the bent plate sections and the bottom surface of the base plate section be a pointed shape. Next, the portions near the base ends in the middle section of the bent plate sections are bent at right angles in opposite directions from each other to form the eave sections.

Effect of the Invention

With the steering column support apparatus of the present invention, construction is achieved that simplifies tuning for stabilizing the forward displacement of the steering wheel during a secondary collision, makes the steering apparatus more compact, lightweight and low cost, and maintains design freedom.

First, in the case of the present invention, engagement between the locking capsule that is fastened to the bracket on the column side and the locking hole that is formed in the bracket on the vehicle side is at only one location in the center section in the width direction, so tuning for releasing engagement at the engagement section and stabilizing the forward displacement of the steering wheel during a secondary collision can be simplified.

Next, the steering apparatus is made more compact, lightweight and low cost, and the design freedom is maintained by connecting and fastening the locking capsule and bracket on the column side, which are both made of metal plate, by welding. In other words, both the locking capsule and the bracket on the column side are made of metal plate and are fastened together by welding, so there is no need for the tip end sections of bolts to protrude from the top side of the locking capsule, and there is no need for nuts to be screwed onto these tip end sections. Therefore, it is possible to suppress an increase in assembly height due to the existence of bolts and nuts, and thus it is possible to make the steering column support apparatus more compact and lightweight. By making the steering column support apparatus more compact and low cost by not needing bolts and nuts, it is possible to maintain design freedom of the portion where the steering apparatus is installed.

BEST MODES FOR CARRYING OUT THE INVENTION

First Example

Figure 21:
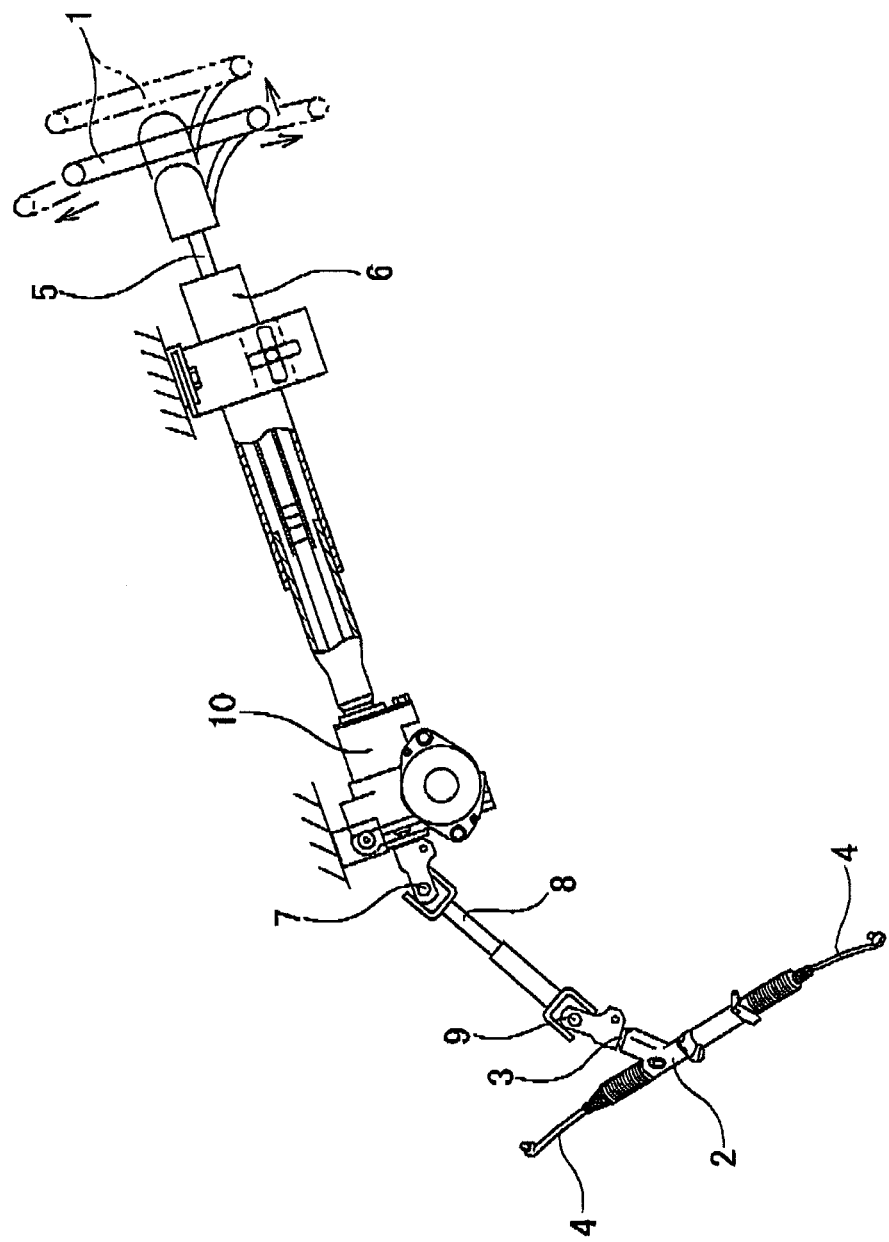
FIG. 21 is a partial cross-sectional side view illustrating a first example of a conventionally known steering apparatus.
Figure 22:
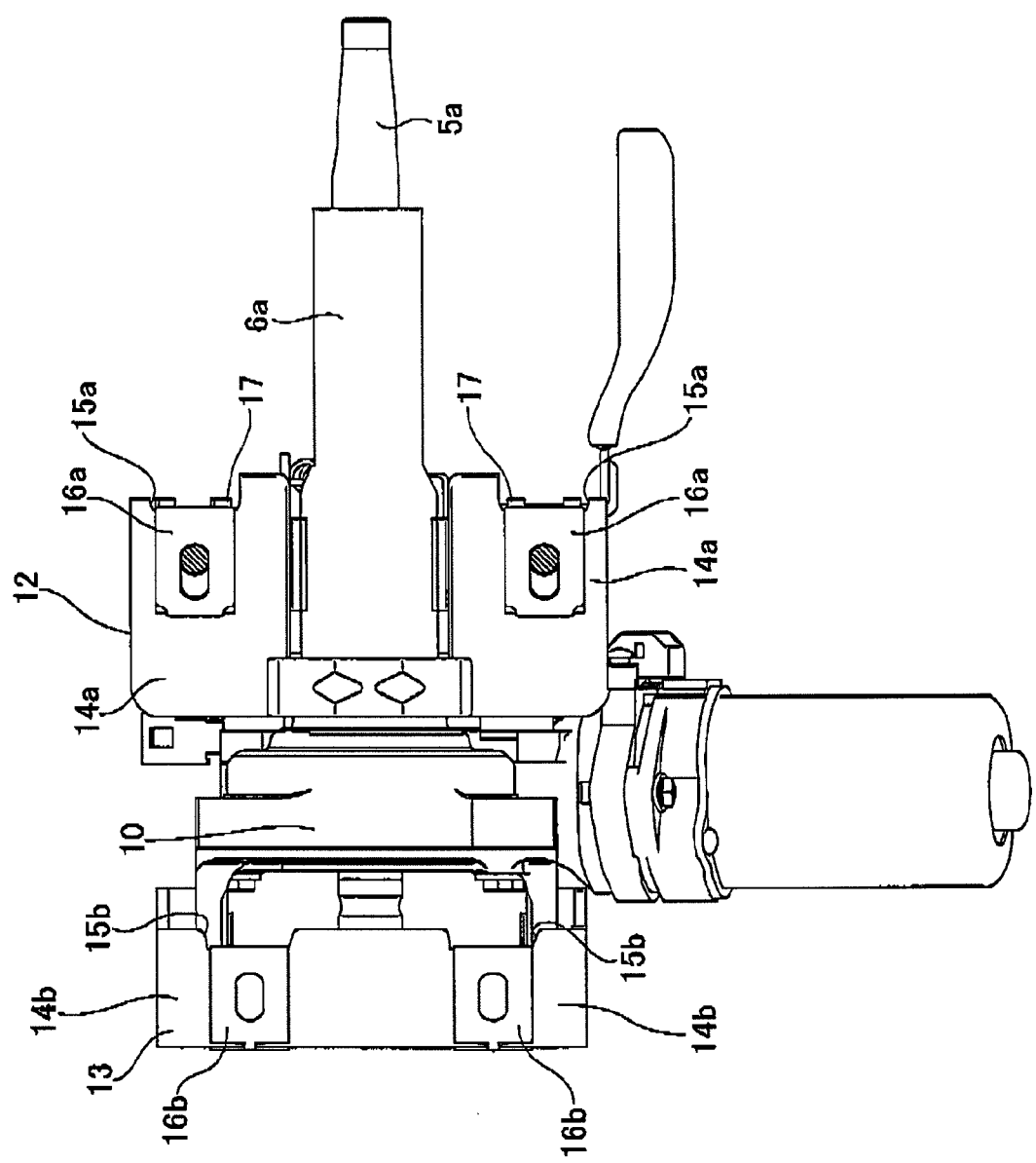
FIG. 22 is a top view of an example of a conventional steering column support apparatus, and illustrates the normal state.
Figure 23:
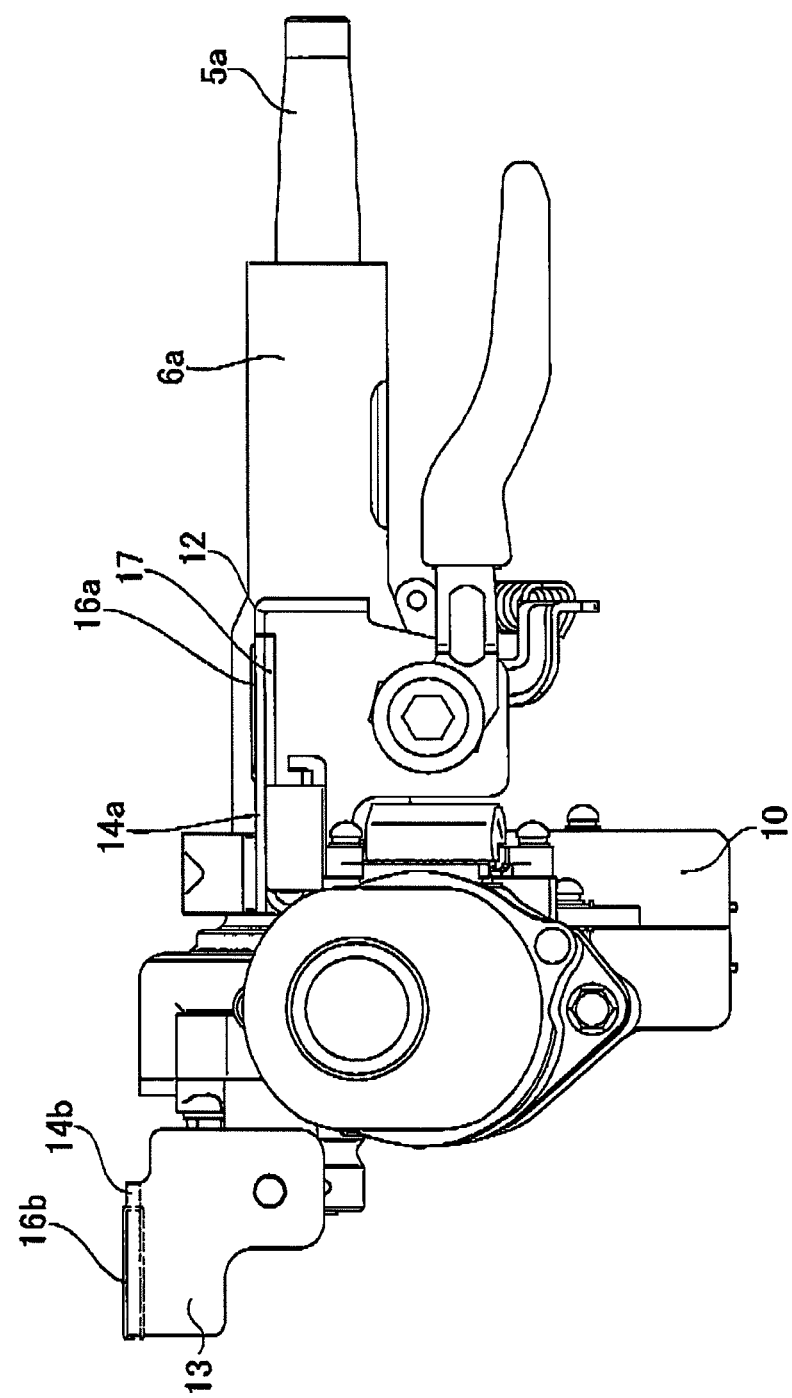
FIG. 23 is a side view illustrating the same state of the apparatus in FIG. 22.
Figure 24:
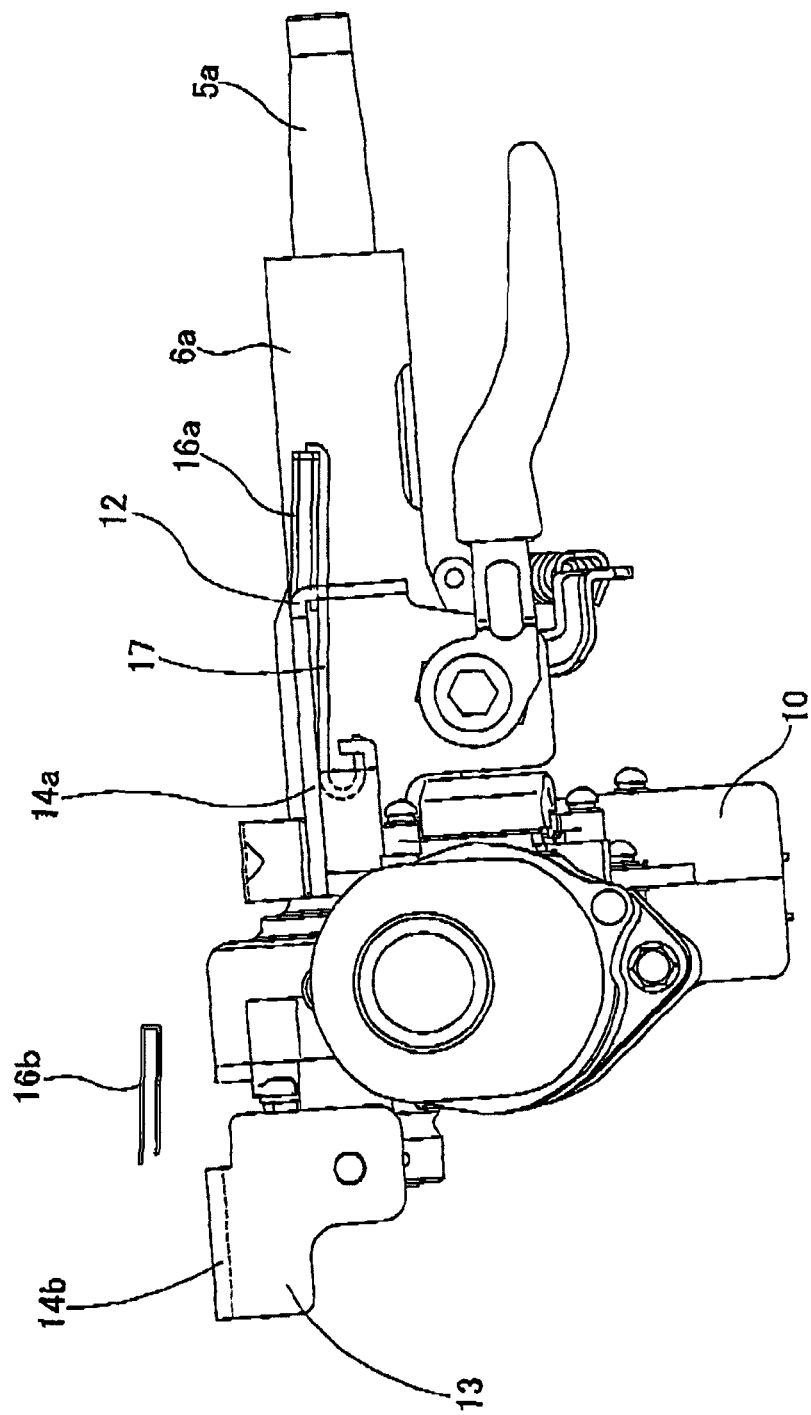
FIG. 24 is a side view of an example of a conventional steering column support apparatus, and illustrates the state when the steering column has displaced in the forward direction during a secondary collision.

FIG. 1 to FIG. 6 illustrate a first embodiment of the present invention. This embodiment illustrates the case of applying the present invention to a tilting and telescopic type steering apparatus that comprises both a tilting mechanism for adjusting the up/down position of the steering wheel 1 (see FIG. 21) and a telescopic mechanism for adjusting the forward/backward position of the steering wheel 1.

In order to construct a telescopic mechanism, a telescopic shaped steering column 6c that can expand or contract along the entire length by fitting the rear section of an inner column 23 on the front side inside the front section of an outer column 24 on the rear side is used. A steering shaft 5b is supported in the inner diameter side of this steering column 6c such that it can rotate freely, however, this steering shaft 5b as well is constructed such that by a male spline section that is formed on the rear section of a circular rod shaped inner shaft that is located on the front side engaging with a female spline section that is formed on the front section of a cylindrical shaped outer shaft 25 that is located on the rear side, the steering shaft 5b can transmit torque as well as expand and contract. With the rear end section of the outer shaft 25 protruding further toward the rear than the opening on the rear end of the outer column 24, the outer shaft 25 is supported on the inner diameter side of the outer column 24 by a bearing such as a single-row deep groove ball bearing 26 or the like that is capable of supporting both a radial load and thrust load such that only rotation is possible. A steering wheel 1 is supported by and fastened to the rear end section of the outer shaft 25. When adjusting the forward/backward position of this steering wheel 1, the outer shaft 25 and the outer column 24 displace in the forward or backward direction, and the steering shaft 5b and steering column 6c expand or contract.

A housing 10a for housing a reduction gear and the like of an electric power steering apparatus is connected and fastened to the front end section of the inner column 23 of this steering column 6c. An electric motor 27, which is the auxiliary power source for the electric power steering apparatus, and a controller 28 for controlling the flow of electricity to this electric motor 27 are fastened to and supported by the top surface of the housing 10a. In order to construct the tilting mechanism, the housing 10a is supported by the vehicle body such that it can swivel around a horizontal shaft. In order for this, a support cylinder 29 is provided in the left/right direction on the upper front end of the housing 10a, and the front end section of the steering column 6c is supported by the vehicle body by a horizontal shaft such as a bolt that is inserted through a center hole 30 in the support cylinder 29 such that the rear section of this steering column 6c can swivel in the raising or lowering direction.

The inner diameter of the front half of the outer column 24 of the middle section or rear section of the steering column 6c can expand or contract elastically. In order for this, a slit 31 is formed in the axial direction on the bottom surface of the outer column 24. The front end section of this slit 31 opens up to a through hole 32 in the circumferential direction (see FIG. 4) that is formed on the edge of the front end of the outer column 24 or in the portion near the front end section of the outer column 24 except the top end section. A pair of thick plate-shaped supported plate sections 33 is located in the portion between both sides in the width direction of the slit 31. These supported plate sections 33 displace together with the outer column 24 when adjusting the position of the steering wheel 1, and function as support brackets on the displacement side.

In the case of this example, the supported plate sections 33 are supported by a bracket 12b on the column side such that adjustment of the up/down position and forward/backward position is possible. This bracket 12b on the column side is normally supported by the vehicle body, however, during a collision accident, breaks away in the forward direction due to the impact of a secondary collision, which allows displacement in the forward direction of the outer column 24. In order for this, the bracket 33 on the column side is supported by a bracket 11 on the vehicle side such that it can break away in the forward direction due to an impact load that is applied during a secondary collision.

The adjustment section of the tilting mechanism and telescopic mechanism is constructed by firmly holding the supported plate sections 33 by a pair of left and right support plate sections 34 of the bracket 12b on the column side. Long holes 35 in the up/down direction having a partial arc shape that are centered around the horizontal shaft that supports the support cylinder 29 with respect to the vehicle body are formed in these support plate sections 34, and long holes 36 in the forward/backward direction that are long in the axial direction of the outer column 24 are formed in the supported plate sections 33. An adjustment rod 37 is inserted through these long holes 35, 36. A head section 38 that is located on the base end section (right end section in FIG. 3) of this adjustment rod 37 engages with the long hole 35 in the up/down direction that is formed in one of the support plate sections 34 (right support plate section in FIG. 3) to prevent rotation, and only allows displacement along this long hole 35 in the up/down direction. On the other hand, a cam apparatus 42 having a driving cam 40 and a driven cam 41 is provided between the nut 39 that is screwed onto the tip end section (left end section in FIG. 3) of the adjustment rod 37 and the outside surface of the other support plate section 34 (left support plate section in FIG. 3). Of these cams, the driving cam 40 can be rotated and driven by an adjustment lever 43.

When adjusting the position of the steering wheel 1, the driving cam 40 is rotated and driven by rotating the adjustment lever 43 in a specified direction (downward), shortening the dimension in the axial direction of the cam apparatus 42. This widens the space between the inside opposing surfaces of the driven cam 41 and the head section 38, and releases the force that the support plate sections 34 on both sides apply to the supported plate sections 33. At the same time, the inner diameter of the portion on the front section of the outer column 24 in which the rear section of the inner column 23 is fitted elastically expands, which lowers the contact pressure that acts in the area of contact between the inner circumferential surface on the front section of the outer column 24 and the outer circumferential surface on the rear section of the inner column 23. In this state, the up/down position and the forward/backward position of the steering wheel 1 can be adjusted within the range in which the adjustment rod 37 can be displaced between the long holes 35 in the up/down direction and the long holes 36 in the forward/backward direction.

After the steering wheel 1 has been moved to a desired position, the dimension in the axial direction of the cam apparatus 42 is expanded by rotating the adjustment lever 43 in the opposite direction (upward) of the specified direction above. As a result, the space between opposing inside surfaces of the driven cam 41 and the head section 38 is shortened, and the supported plate sections 32 are held firmly on both sides by the support plate sections 34. At the same time, the inner diameter of the portion on the front section of the outer column 24 in which the rear section of the inner column 23 is fitted elastically contracts, and the contact pressure acting at the area of contact between the inner circumferential surface of the front section of the outer column 24 and the outer circumferential surface of the rear section of the inner column 23 increases. In this state, the steering wheel 1 is held in the adjusted up/down and forward/backward positions.

In this embodiment, in order to increase the supporting force for holding the steering wheel 1 in the adjusted position, a friction plate unit 44 can be held between the inside surfaces of the support plate sections 34 and the outside surfaces of the supported plate sections 33. The friction plate unit 44 is formed by alternately overlapping one or a plurality of first friction plates having long holes that are aligned with the long holes 35 in the up/down direction, and one or a plurality of second friction plates having long holes that are aligned with the long holes 36 in the forward/backward direction. The detailed construction and function of this kind of friction plate unit 44 is known (JP2007-69821(A) and JP2008-100597(A)), and is not related to the gist of the present invention, so a detailed drawing and explanation are omitted.

Furthermore, the bracket 12b on the column side breaks away in the forward direction with respect to the bracket 11 on the vehicle side due to the impact load of a secondary collision, however, it is supported so that it cannot drop downward even as the secondary collision advances. The bracket 11 on the vehicle side is fastened to and supported by the vehicle body and does not displace in the forward direction during a secondary collision, and this bracket is formed by punching and bending of metal plate, such as steel plate, having sufficient strength and rigidity. The bracket 11 on the vehicle side is a flat plate, and the rigidity is improved by bending downward the end sections on both sides and the rear end section. A locking hole (locking notch) 45 that is open on the front edge and that extends in the axial direction of the steering column 6c is formed in the center section in the width direction of the bracket 11 on the vehicle side, and a pair of installation holes 46 is formed in the rear section of the bracket 11 on the vehicle side at positions on both the left and right sides of the locking hole 45. The locking hole 45 is covered by a locking capsule 53 and is formed up to near the rear end section of the bracket 11 on the vehicle side. This kind of bracket 11 on the vehicle side is supported by and fastened to the vehicle body by bolts or studs that are inserted through the installation holes 46. In this example, the locking hole 45 has the shape of a notch that is open on the front end, however, the shape of the locking hole is not limited to this, and could be a closed hole that extends in the axial direction of the steering column 6c and that is closed on the front end, and that prevents the locking capsule from dropping from the bracket 11 on the vehicle side.

The bracket 12b on the column side is connected to the bracket 11 on the vehicle side by way of the locking capsule 53 so as to be able to break away in the forward direction during a secondary collision. In this example, the bracket 12b on the column side and the locking capsule 53 are both made of the same kind of metal plate having sufficient strength and rigidity such as carbon steel plate, and are welded together. The locking capsule 53 comprises a base plate section 54, a pair of left and right raised sections 55 and a pair of left and right eave sections 56. The base plate section 54 is flat. The raised sections 55 are bent and extend upward at nearly right angles from both end sections in the width direction of the base plate section. Furthermore, the eave sections 56 are bent at nearly right angles from the top ends of the raised sections 55 and extend in opposite directions from each other. The difference in the height H between the bottom surfaces of these eave sections 56 and the bottom surface of the base plate section 54 is the same as or a little greater than the thickness T of the metal plate of the bracket 11 on the vehicle side (H≧T).

The locking capsule 53 having this kind of construction is placed on the top plate section 57 that is formed on the top end section of the bracket 12b on the column side, and fastened to the top plate section 57 by a weld 58. This top plate section 57 is formed such that it is continuous with the edges on the top ends of a pair of left and right support plate sections 34 of the bracket 12b on the column side, and is flat the same as the base plate section 54. In the case of this example, the dimension in the forward/backward direction of the base plate section 54 is a little smaller than the dimension in the forward/backward direction of the portion of the top plate section 57 that overlaps the base plate section 54. Moreover, with this base plate 54 overlapping with the top plate section 57, the end sections in the forward/backward direction of the top plate section 57 protrude in the forward/backward direction from the end edges in the forward/backward direction of this base plate section 54. Welding 58 is performed between the end edges in the forward/backward direction of the base plate 54 and the top surface of the end sections in the forward/backward direction of the top plate section 57. In this example, these welds 58 are fillet welds.

With the locking capsule 53 fastened by welds to the center section of the top surface of the top plate section 57 of the bracket 12b on the column side, a pair of locking grooves 59, into which the portions of the metal plate of the bracket 11 on the vehicle side on both sides of the locking hole 45 can be inserted, are formed between the portions near both ends of the top surface of the top plate section 57 and the bottom surface of the eave sections 56. Therefore, the portions of the bracket 11 on the vehicle side that are on both sides of the locking hole 45 are inserted into these locking grooves 59, and the locking capsule is assembled in the back ends section on the inside of the locking hole 45. In this state, the eave sections 56 and the portions of the bracket 11 on the vehicle side on both sides of the locking hole 45 overlap.

With the base plate section 54 of the locking capsule 53 and the locking hole 45 engaged (fitted) in this way, small through holes 49a, 49b are formed at a plurality of aligned locations (six locations in the example in the figure) in the eave sections 56 and the portions of the bracket 11 on the vehicle side that are on both sides of the locking hole 45. Connecting pins 50 span between these small through holes 49a, 49b. Alternatively, the small through holes 49b that are formed in the bracket 11 on the vehicle side can also be small notches that are open toward the inside of the locking hole 45. In the present invention, construction that employs the use of connecting pins 50 is preferable, however, construction could be employed wherein instead of connecting pins, the locking capsule 53 is pressure fitted inside the locking hole 45.

With the small through holes 49a, 49b aligned, these connecting pins 50 made of synthetic resin are formed by performing injection molding of injecting molten synthetic resin into these aligned small through holes 49a, 49b and allowing the synthetic resin to solidify, so that the connecting pins 50 span between these small through holes 49a, 49b. However, formation of these connecting pins 50 is not limited to this, and it is also possible to form these connecting pins 50 by pressing solid cylindrical shaped pins (base material) made of synthetic resin or light metal alloy with a large force in the axial direction to pressure fit these pins into the small through holes 49a, 49b, such that the pins span between these holes. In either case, part of the synthetic resin or light metal alloy of these connecting pins is forced to enter into the space between the top and bottom surfaces of the bracket 11 on the vehicle side and the opposing surfaces that face these top and bottom surfaces, which are the bottom surface of the eave sections 56 and the top surface of the top plate section 57 of the bracket 12b on the column side, which makes it possible to eliminate vibration in the installation section of the bracket 12b on the column side to the bracket 11 on the vehicle side. In this case, vibration of the steering column 6c that is supported by the bracket 12b on the column side is prevented, so it is possible to improve the operational feeling when operating the steering wheel 1 that is supported by and fastened to the rear end section of the steering shaft 5b that is supported by the steering column 6c such that it can rotate freely.

With the construction of this example, constructed as described above, in addition to being able to simplify tuning for stabilizing forward displacement of the steering wheel during a secondary collision, construction is achieved that makes it possible to make the apparatus more compact, lightweight and low cost, and maintain design freedom.

First, the engagement section between the locking capsule 53 that is fastened to the bracket 12b on the column side and the locking hole 45 that is formed in the bracket 11 on the vehicle side is only at one location in the center section in the width direction, so an impact load that is transmitted to the locking capsule 53 during a secondary collision is transmitted nearly uniformly to each of the connecting pins 50, and these connecting pins 50 shear essentially at the same time. As a result, displacement in the forward direction of the steering column 6c that is fastened to the bracket 12b on the column side can be performed stably without excessive change in the inclination angle of the center axis. Therefore, engagement at the engagement section between the bracket 11 on the vehicle side and the locking capsule 53 is released, and tuning for stabilizing the forward displacement of the steering wheel 1 becomes easier.

Figure 1:
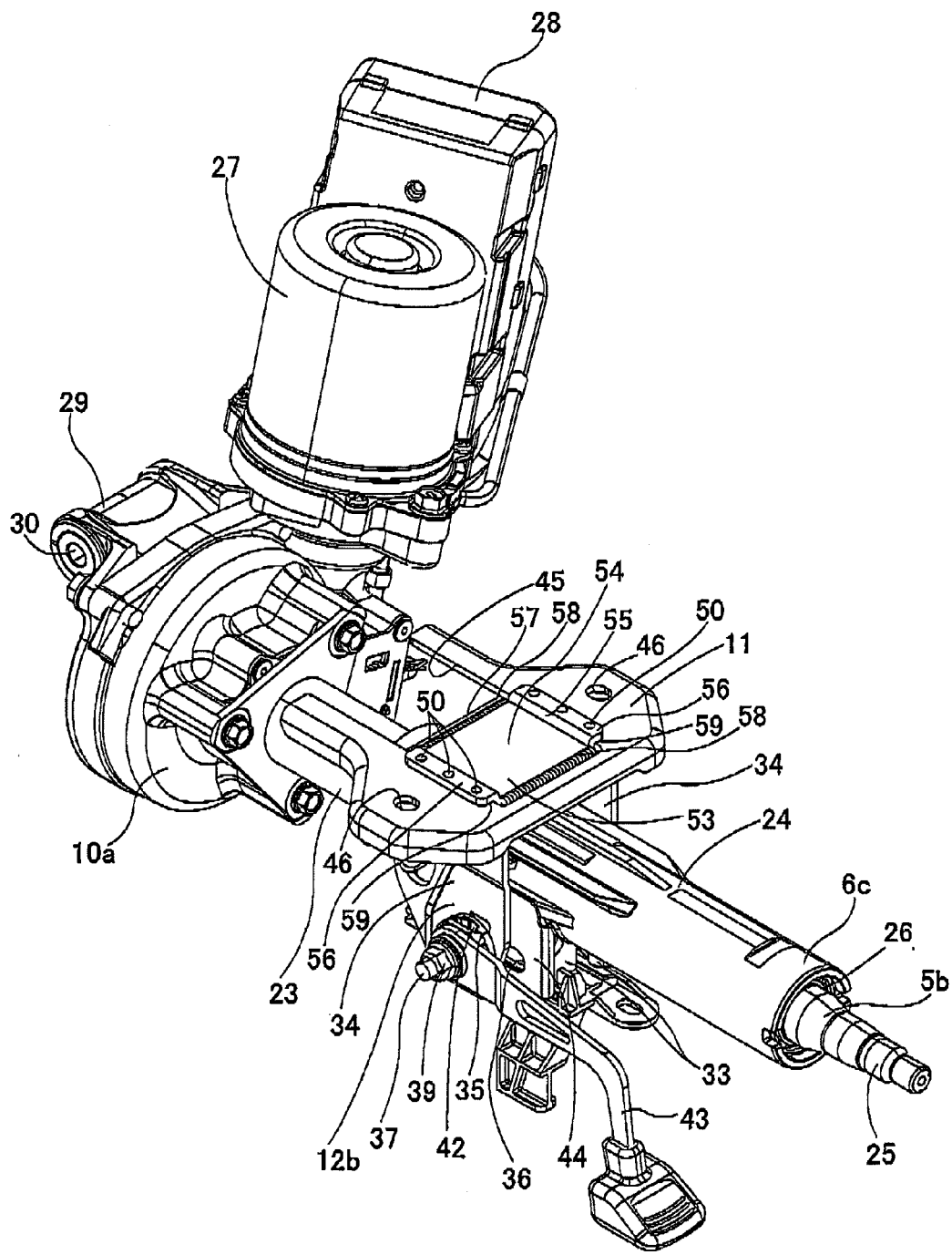
FIG. 1 is a perspective view illustrating a first example of an embodiment of the present invention, and illustrates the state as seen from the upper rear.
Figure 2:
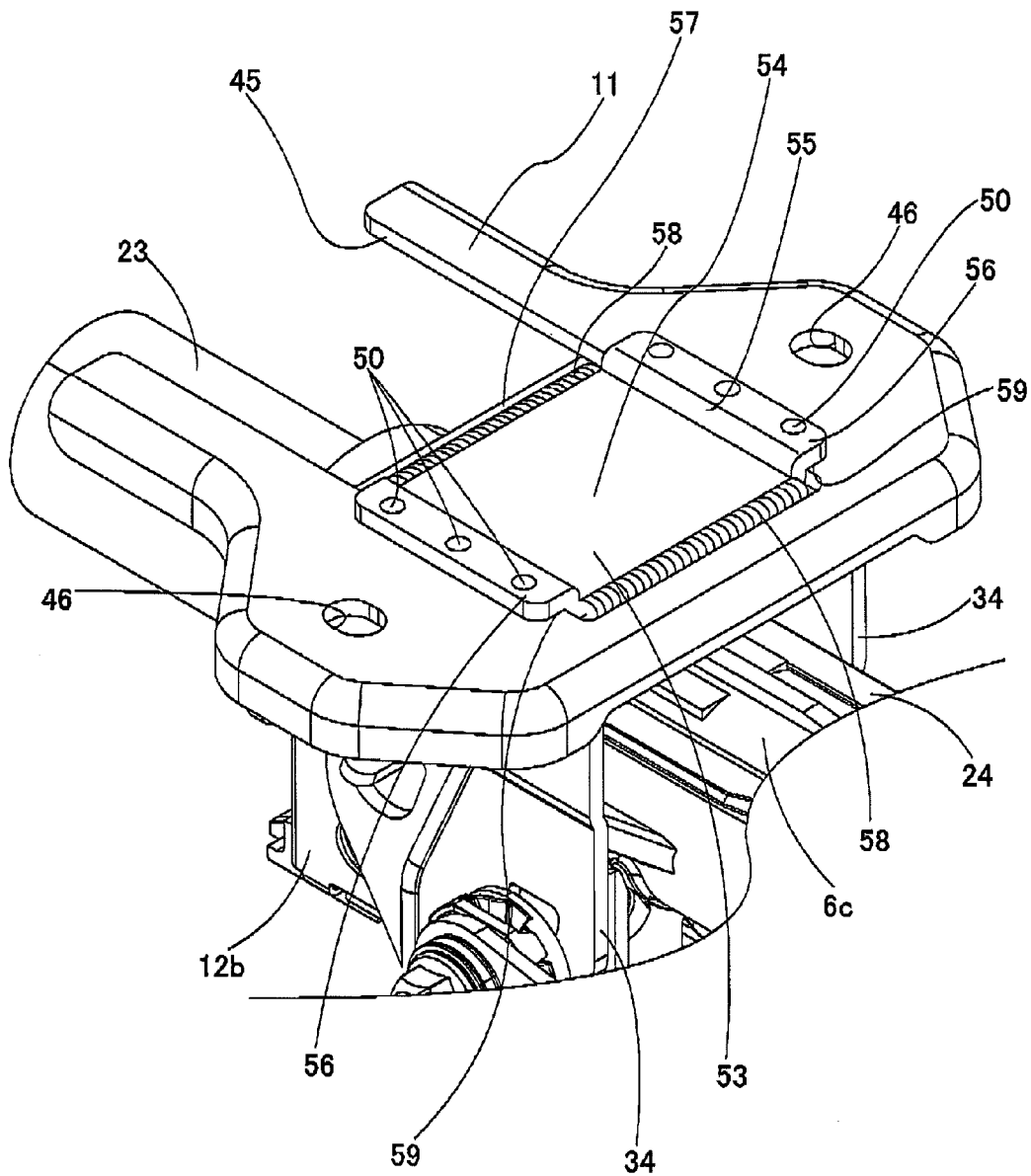
FIG. 2 is a perspective view of the main section which is shown in the center section in FIG. 1.
Figure 3:
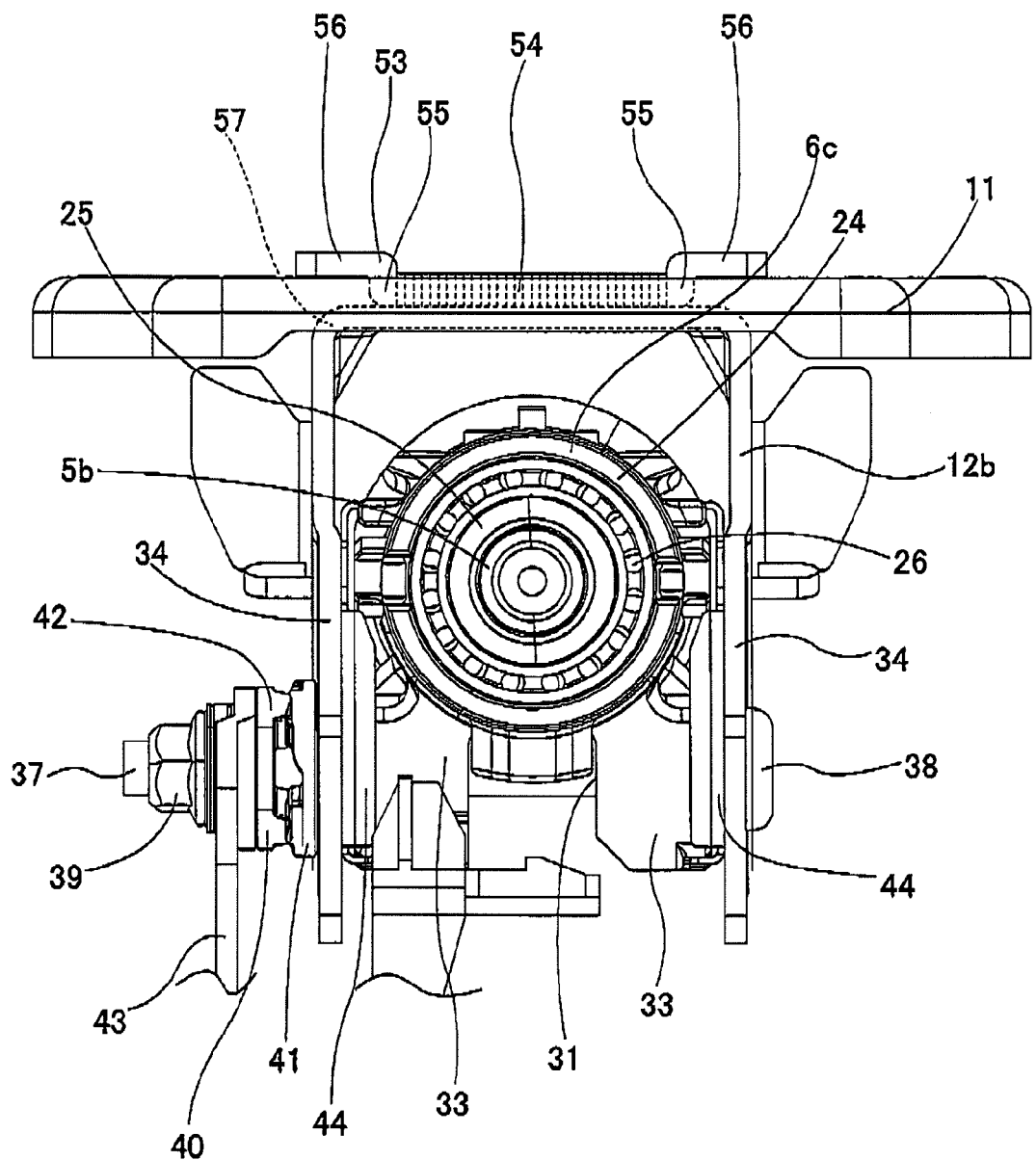
FIG. 3 is an end view of the construction in FIG. 1 with part omitted, and illustrates the state as seen from the rear.
Figure 4:
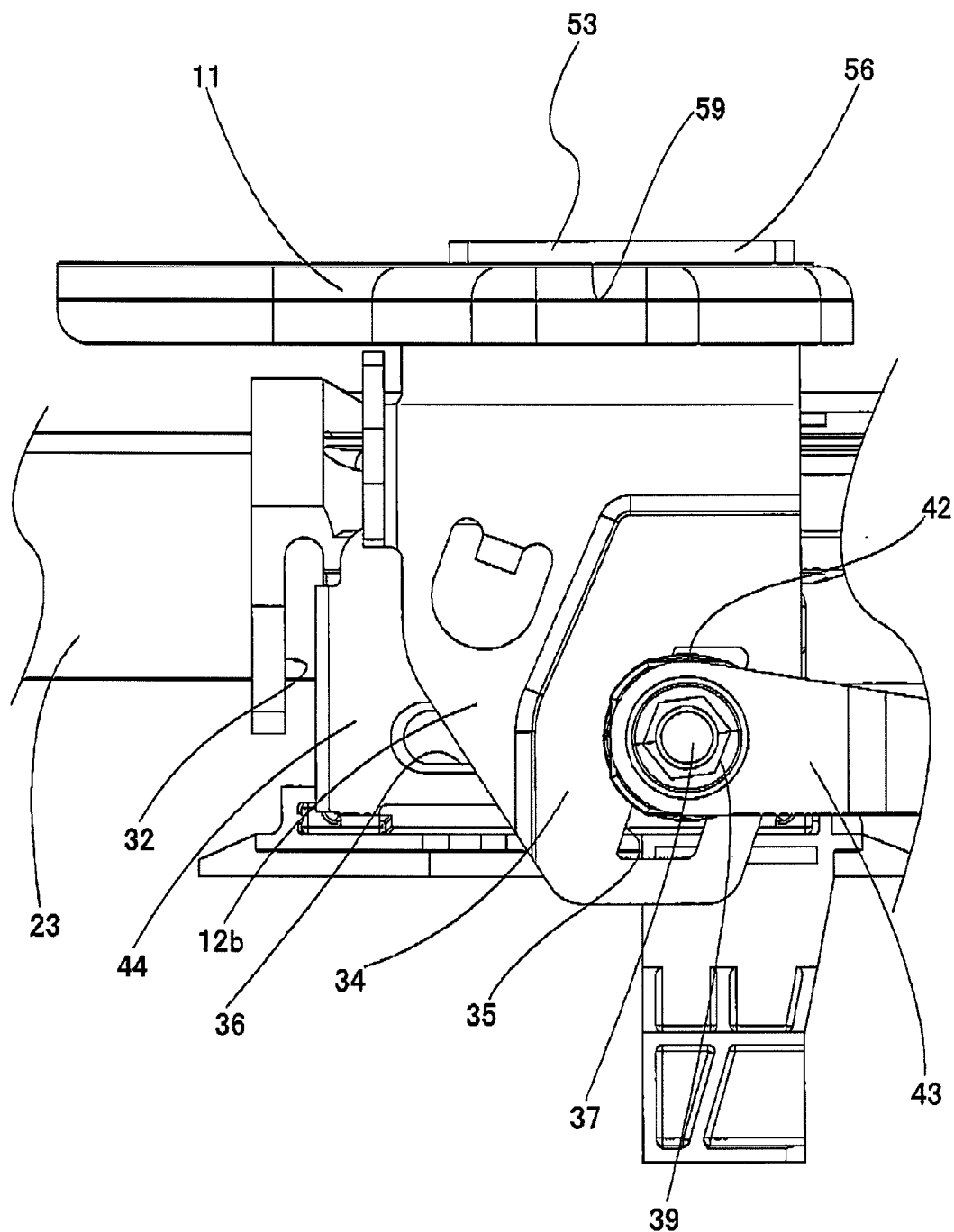
FIG. 4 is a side view of the main section of the center section in FIG. 1.
Figure 5:
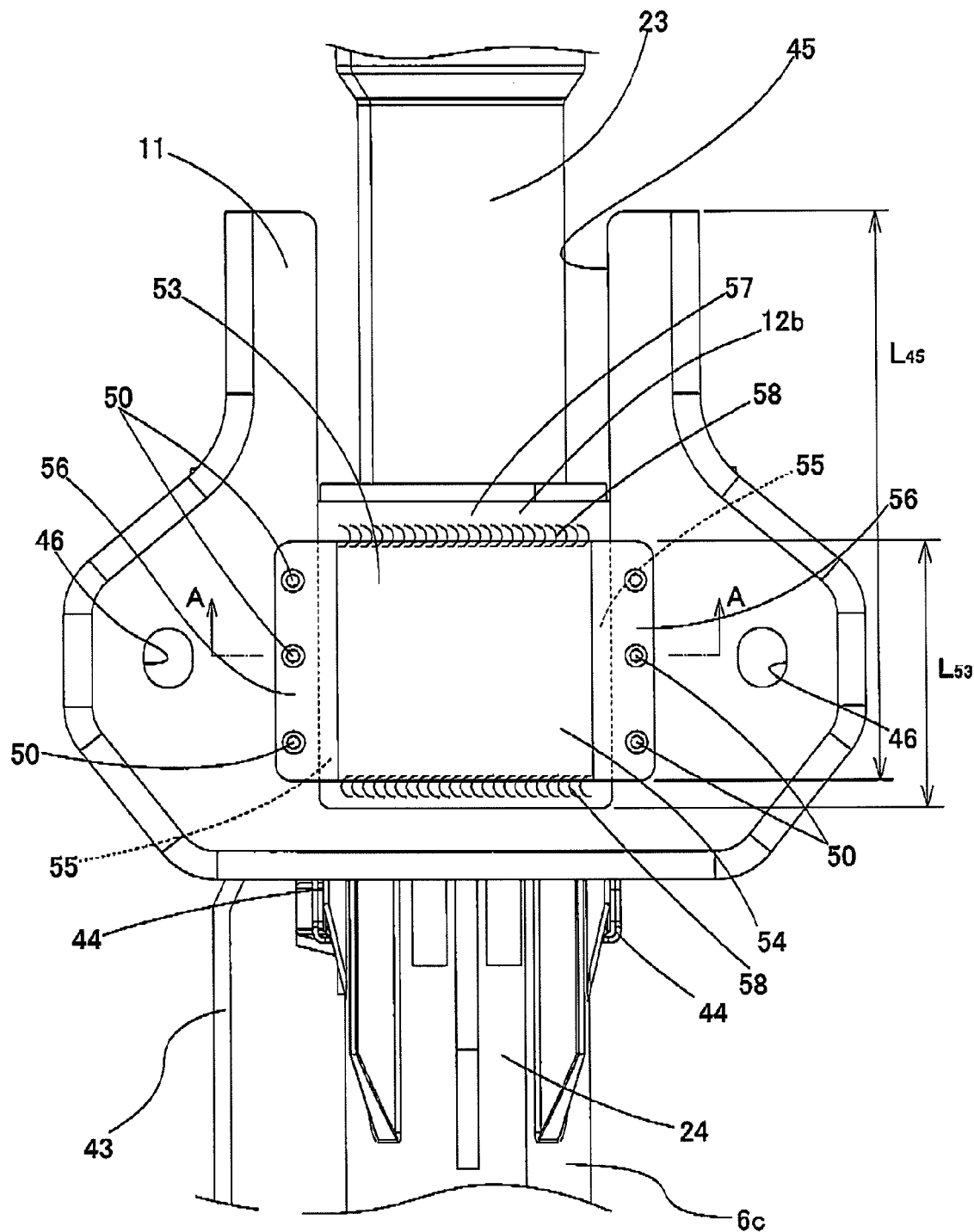
FIG. 5 is a top view of the main section of the center section in FIG. 1.
Figure 6:
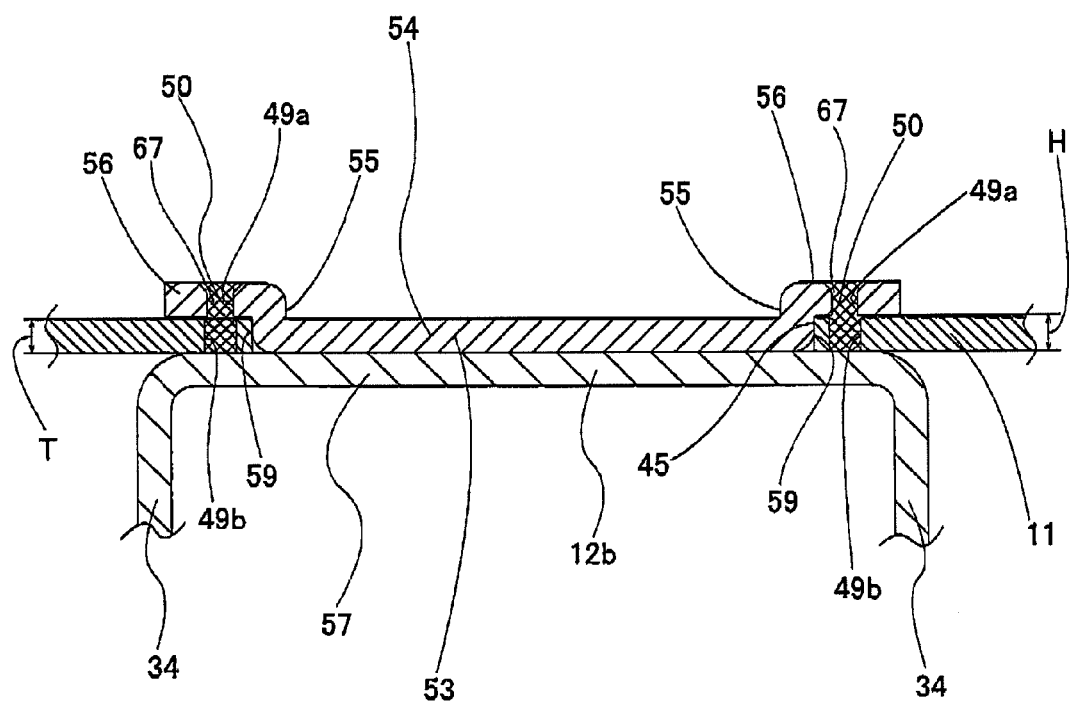
FIG. 6 is an enlarged cross-sectional view of section A-A in FIG. 5.
Figure 7:
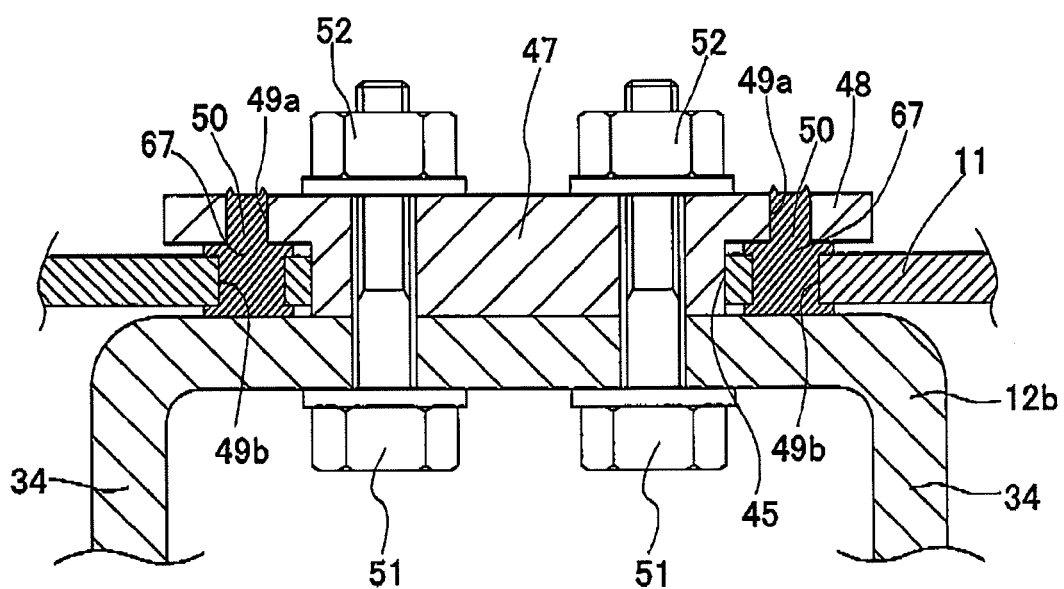
FIG. 7 is a cross-sectional view corresponding to FIG. 6, and illustrates an example of different construction for comparison with the construction of the present invention.

On the other hand, in addition to the construction of this example, construction for supporting the bracket 12b on the column side by the bracket 11 on the vehicle side so as to be able to break away in the forward direction during a secondary collision such as illustrated in FIG. 7 can also be employed wherein, a locking capsule that is formed by performing plastic working such as forging of a ferrous alloy such as mild steel, or die casting of a light metal alloy such as aluminum alloy or magnesium alloy, or injection molding of a high strength, high function synthetic resin such as polyacetal can be used as the locking capsule 47, and this locking capsule 47 can be connected and fastened to the bracket 12b on the column side using a plurality of bolts 51 and nuts 52. In this case, the tip end sections of the bolts 51 protrude from the top side of the locking capsule 47, and nuts 52 must be screwed onto the tip end sections. In this kind of construction, the proper positional relationship between the bolts 51 and the nuts 52 must be maintained, and one of the members must be rotated while preventing the other member from rotating, so the work is troublesome, and in addition to increasing the cost of parts (manufacturing costs and management costs), increases the assembly costs.

Figure 25:
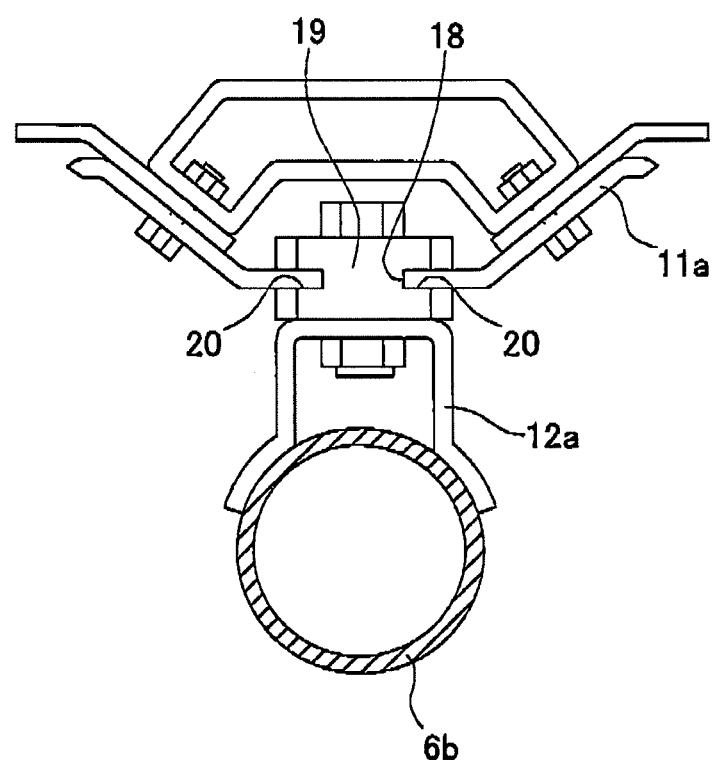
FIG. 25 is a drawing illustrating an example of conventional construction, and is a cross-sectional view of a virtual plane that exists in a direction orthogonal to the center axis of the steering column.
Figure 26:
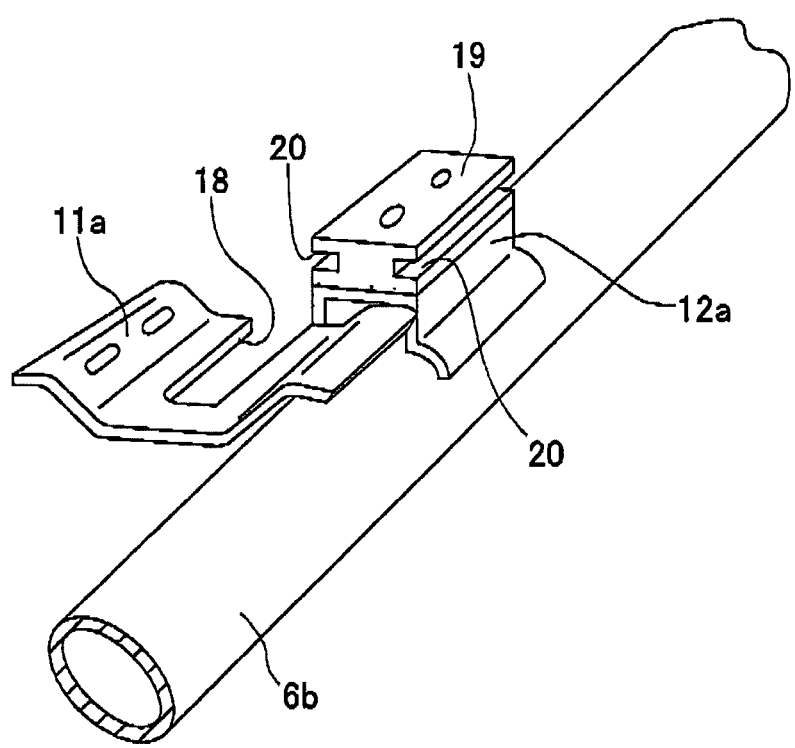
FIG. 26 is a perspective view of the construction illustrated in FIG. 25, and illustrates the state of connecting the bracket on the vehicle side and the bracket on the column side.
Figure 27:
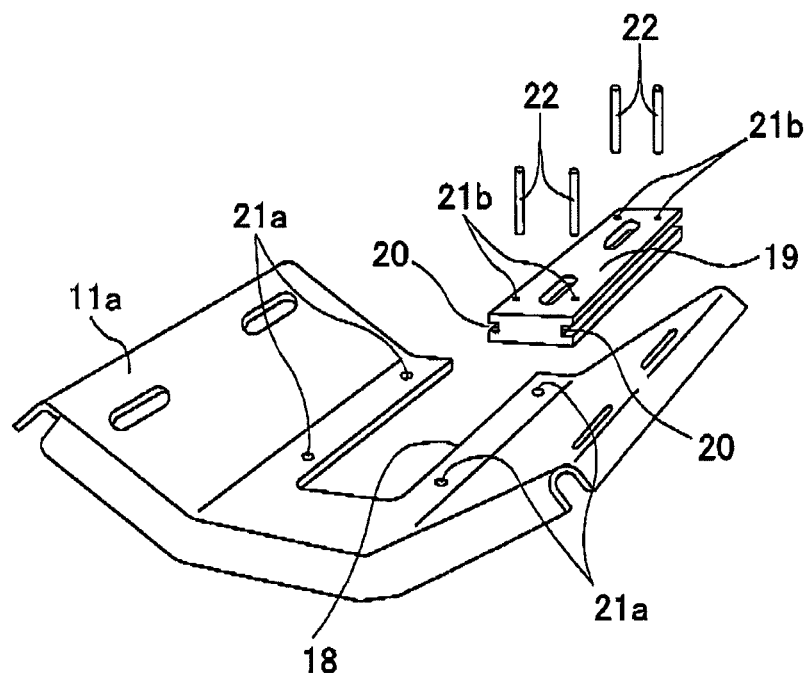
FIG. 27 is a perspective view of the construction illustrated in FIG. 25 with the steering column omitted and the connecting pins depicted.

Furthermore, this construction, when compared with the conventional construction illustrated in FIG. 25 to FIG. 27 can suppress the assembly height, however, an increase in assembly height due to the amount that the nuts 52 protrude from the top surface of the bracket 12b on the column side cannot be avoided. It becomes necessary to devise the shape of the portion of the vehicle body that is located above this connecting section, for example, recessing the surface of the vehicle body in order to prevent interference with the nuts 52, or to increase the distance between the top surface of the locking capsule 47 and part of the vehicle body. In either case, from the aspect of designing the portion where an impact absorbing steering apparatus is installed, this becomes a cause for the loss of design freedom.

However, in the case of this example wherein the locking capsule 53 and bracket 12b on the column side are both made of metal plate and are connected and fastened together by welding, protrusion from the top surface of the bracket on the vehicle side is due only to the pair of left and right eave sections 56 of the locking capsule 53. The thickness of the metal plate of the eave sections 56, in the case of a steering column support apparatus for a typical automobile, is only 2 to 4 mm. Moreover, there are no protruding sections (for example, the head sections of the bolts) on the bottom surface of the top plate section 57. Therefore, in this example, it is possible to suppress the increase in the assembly height that occurs in the case of when the locking capsule 47, bolts 51 and nuts 52 are used due to the existence of the bolts and nuts, so it is possible to make the apparatus more compact and lightweight. Furthermore, because there is no need for bolts and nuts, it is possible to lower the cost of the apparatus, and because the apparatus is more compact, it is possible to maintain design freedom of the portion where the steering apparatus is installed.

In this example, the length $L_{45}$ in the forward/backward direction of the locking hole 45, in which the locking capsule 53 that displaces in the forward direction together with the outer column 6c during a secondary collision is locked, is sufficiently greater than the length $L_{53}$ in the same direction of the locking capsule 53 ($L_{45} \gg L_{53}$). Particularly, in this example, the length $L_{45}$ of the locking hole is 2 times the length $L_{53}$ of the locking capsule 53 or greater ($L_{45} \leq 2L_{53}$). During a secondary collision, when the locking capsule 53 has displaced all the way forward together with the outer column 24, or in other words, even when the locking capsule can no longer displace in the forward direction due to an impact load that was applied from the steering wheel 1, the portion of at least the rear end sections of the eave sections 56 of the locking capsule 53 that can support the weight of the steering column 6c and the bracket 12b on the column side does not come out all the way from the locking hole 45. That is, even when the dimension in forward/backward direction of the bracket 11 on the vehicle side is limited, the length (collapse stroke) that the locking capsule 53 displaces in the forward direction during a secondary collision is maintained, and even when the secondary collision advances, the rear end sections of the eave sections 56 that are formed on both sides in the width direction of the locking capsule 53 are positioned on the top side of the front end section of the bracket 11 on the vehicle side, and can prevent the locking capsule 53 from dropping. However, when the dimension in the forward/backward direction of the bracket 11 on the vehicle side can be sufficiently maintained, as described above, it is possible to prevent the locking capsule 53 from dropping from the bracket 11 on the vehicle side, and at the same time increase the rigidity of the front section of the bracket 11 on the vehicle side by forming the locking hole to be a closed hole with no opening on the edge of the front end. With this kind of construction, the steering wheel 1 is prevented from dropping excessively, and even after a collision accident, the steering wheel can be easily operated; for example, when a vehicle that was in an accident can move under its own power, it is possible to easily drive the vehicle that was in the accident from the site of the accident to the side of the road.

Moreover, in this example, a pair of left and right protruding sections that protrude further outward in the width direction than the left and right outside surfaces of the bracket 12b on the column side can be formed in portions of the bracket 12b on the column side, and part of the edges on the top ends of these protruding sections can closely face part of the bottom surface of the bracket 11 on the column side. In this case, when a moment around the axial direction is applied to the bracket 12b on the column side and the bracket 12b on the column side inclines a little, part of the edge on the top end of one of the protruding sections comes in contact with part of the bottom surface of the bracket 11 on the vehicle side, making it possible to prevent the bracket 12b on the column side from inclining more than that. With this construction, even though a moment is applied to the bracket 12b on the column side, the amount of relative displacement between the bracket 12b on the column side and the bracket 11 on the vehicle side is kept small, and it is possible to prevent forces that could damage the bracket 12b on the column side or the locking capsule 53 from being applied to these members.

In this example, together with using a tilt and telescopic mechanism, it is also possible to install a friction plate unit 44 for increasing the holding force for keeping the steering wheel 1 in an adjusted position, however, in that case, it becomes easy for variation in the break away load during a secondary collision to occur due to an accumulation of manufacturing errors. However, in this example, due to the engagement between the single locking capsule 53 and the bracket 11 on the vehicle side, it is possible to suppress variation in the break away load. Therefore, it is possible to properly perform tuning for lessening the impact applied to the body of the driver that collides with the steering wheel 1 during a secondary collision.

Furthermore, in this example, it is possible to provide an energy absorbing member between the portion that does not displace during a secondary collision (for example, the bracket 11 on the vehicle side) and the portion that displaces in the forward direction due to a secondary collision (for example, the outer column 24); and this energy absorbing member absorbs impact energy while deforming plastically due to the displacement in the forward direction. This energy absorbing member is placed in the center section in the width direction of the outer column 24, and effectively deforms plastically due to the forward displacement of the outer column 24. Various kinds of this kind of energy absorbing member have conventionally been known, such as disclosed in JP2000-6821(A), so drawings and detailed explanations are omitted.

Second Example

Figure 8:
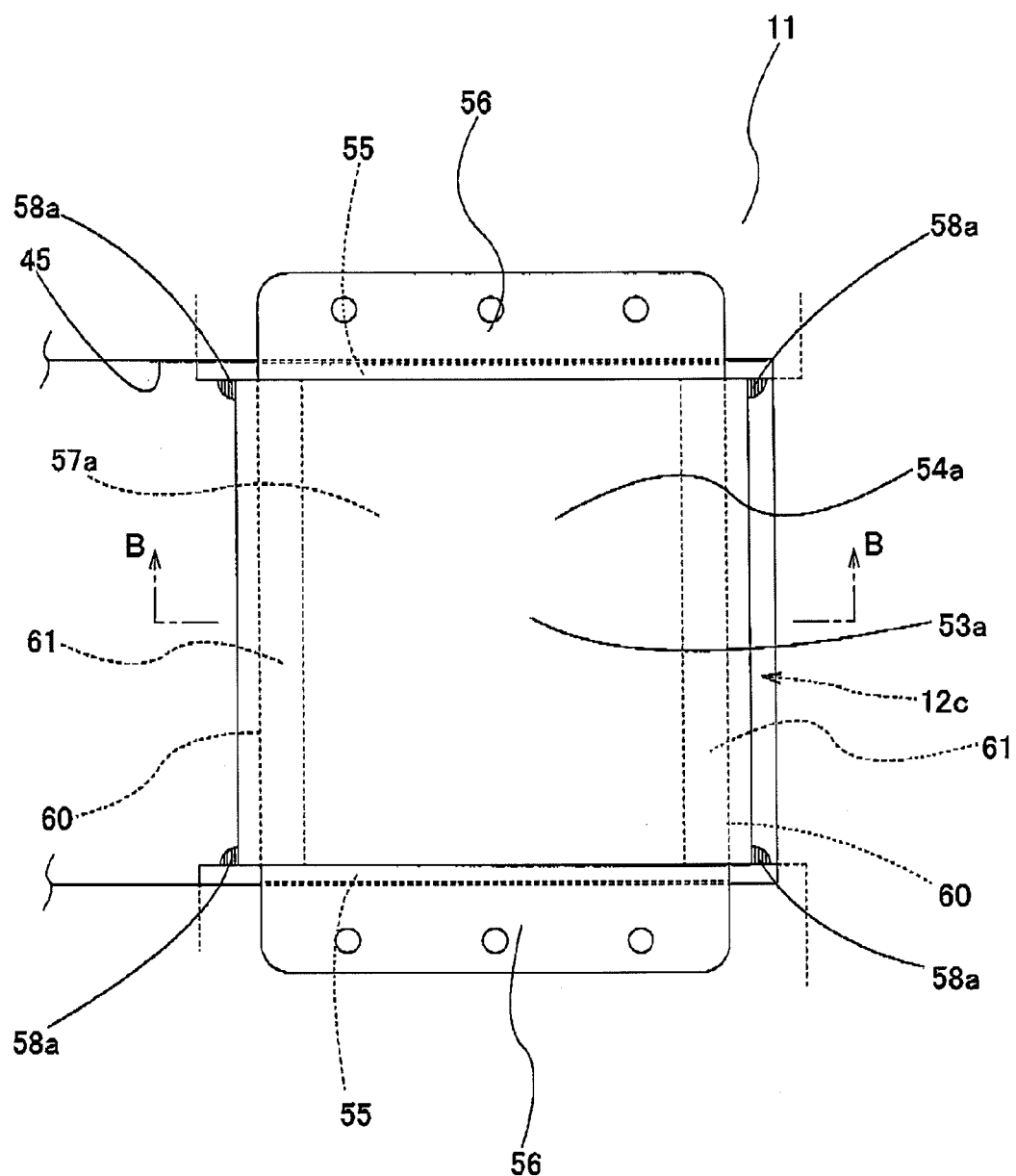
FIG. 8 is a top view of the main section of a second example of an embodiment of the present invention.
Figure 9:
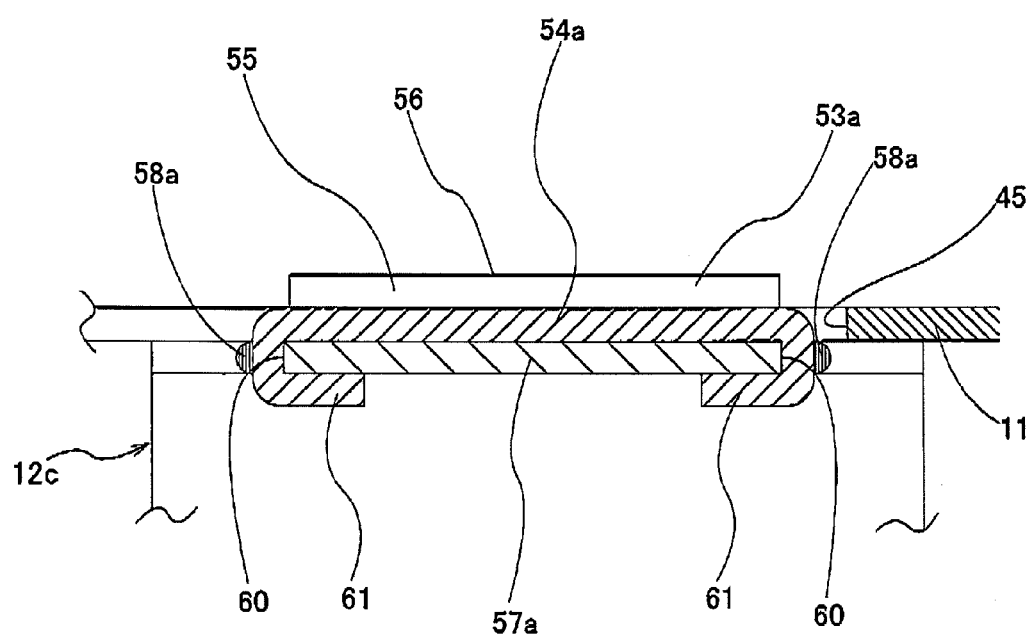
FIG. 9 is a cross-sectional view of section B-B in FIG. 8.

FIG. 8 and FIG. 9 illustrate a second example of an embodiment of the present invention. In this example, the dimension in the forward/backward direction of the base plate section 54a of the locking capsule 53a is greater than the dimension in the forward/backward direction of the raised sections 55 and the eave sections 56. Moreover, a notch 60 is formed in the center section in the width direction of both end sections in the forward/backward direction of the top plate section 57a of the bracket 12c on the column side, and the dimension in the forward/backward direction of the center section in the width direction of the top plate section 57a is less than the dimension in the forward/backward direction of the left and right end sections of the top plate section 57a. This dimension in the forward/backward direction of the center section in the width direction is equal to or greater than the dimension in the forward/backward direction of the raised sections 55 and the eave sections 56. Furthermore, the width dimension in the left/right direction of the base plate section 54a is a little less than the width dimension of the notches 60.

In order to connect and fasten together this kind of locking capsule 53a and bracket 12c on the column side, the raised sections 55 and eave sections 56 are located in the portion in the forward/backward direction between the notches 60, and the bottom surface of the base plate section 54a and the top surface of the top plate section 57a are brought into contact. Next, the portions on both end sections in the forward/backward direction of this base plate section 54a that protrude from both end sections in the forward/backward direction in the center section in the width direction of the top plate section 57a bend downward and back 180 degrees, to form bent back sections 61 having U shaped cross sections. These bent back sections 61 wrap around the end sections in the forward/backward direction of the center section in the width direction of the top plate section 57a. Furthermore, welding 58a is performed between the edges on both the left and right ends of these bent back sections 61 and the edges on both ends in the forward/backward direction of the raised sections 55, and the top plate section 57a, to connect the locking capsule 53a and the bracket 12c on the column side so that there is no movement between the members. When welding and fastening the locking capsule 53a and the bracket 12c on the vehicle side, instead of the fillet welds illustrated in the figure, or in addition to the fillet welds, spot welding can also be employed.

With the construction of this example, constructed as described above, in addition to connecting and fastening together the locking capsule 53a and the bracket 12c on the column side with welds 58a so that there is no movement between the members, the bent back sections 61 wrap around the end sections in the forward/backward direction in the center section in the width direction of the top plate section 57a, so the locking capsule 53a and the bracket 12c on the column side are also connected by the mechanical engagement of this pair of front and back wrap-around sections. Therefore, it is possible to prevent the locking capsule 53a and the bracket 12c on the column side from separating from each other even if the welding between them is poor, and then it is possible to prevent the steering column 6c that is supported by the bracket 12c on the column side from dropping. It is also possible to use this kind of construction on only one end in the forward/backward direction, and to join the members on the other end using welding as in the first example. The construction and function of other parts are the same as in the first example of the embodiment, so explanations of identical parts are omitted.

Third Example

Figure 10:
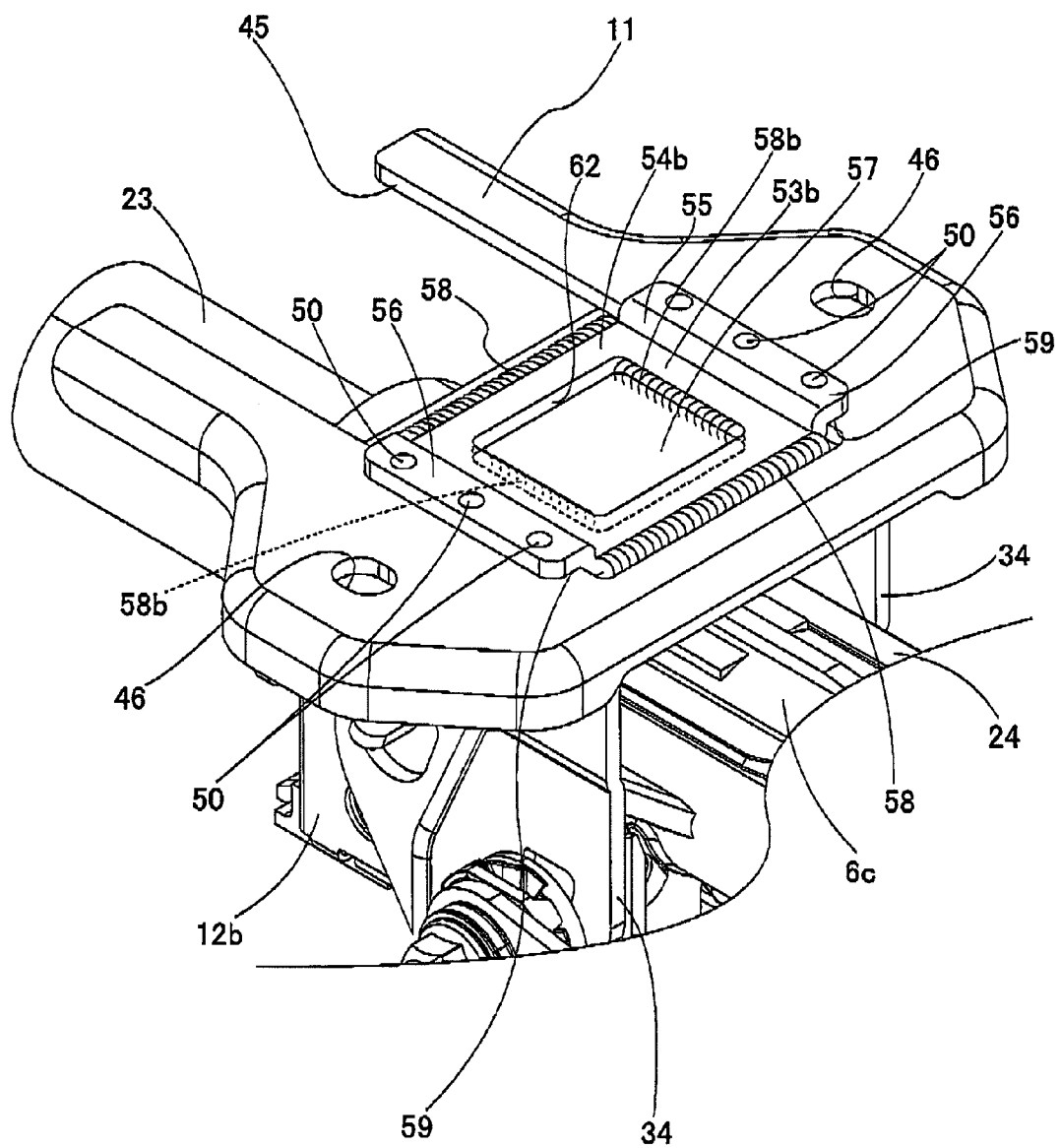
FIG. 10 is a drawing similar to FIG. 2, and illustrates a third example of an embodiment of the present invention.

FIG. 10 illustrates a third example of an embodiment of the present invention. In the case of this example, a nearly square through hole 62 is formed in the center section of the base plate section 54b of the locking capsule. Welding 58b is performed between the edges on both the left and right sides of the inner peripheral edge of this through hole 62, and the top surface of the top plate section 57 of the bracket 12b on the column side. Moreover, welding 58 is also performed between the top surface of both end sections in the forward/backward direction of the top plate section 57 and the edges on both ends in the forward/backward direction of the base plate section 54b as in the first example of the embodiment. The shape of the through hole 62 does not necessarily need to be a square shape, and could also be another kind of four-cornered shape such as a rectangular shape or trapezoidal shape, or could be a polygon shape having more than four corners.

In the case of the construction of this example, the length of the welding between the base plate section 54b of the locking capsule 53b and the top plate section 57 of the bracket 12b on the column side can be lengthened by the amount of the weld 58b along the edges on both the left and right sides of the through hole 62. The decrease in strength and rigidity of the base plate section 54b due to the formation of the through hole 62 is no problem at all from the aspect of maintaining the strength of the steering column support apparatus, including the maintaining the strength of the connection between the base plate section 54b and the top plate section 57. The reason for this is that because of the weld 58b that was performed on the edges on both the left and right sides of the through hole 62, the base plate section 54b is more firmly connected and fastened to the top plate section 57.

As explained above, with the construction of this example, the strength of the connection between the locking capsule 53b and the bracket 12b on the column side can be made even stronger. Moreover, not only is the strength of the connection improved, but also, by forming the through hole 62, the apparatus can be made more lightweight. The construction and functions of other parts are the same as in the first example of the embodiment, so any redundant drawings and explanations are omitted.

Fourth Example

Figure 11:
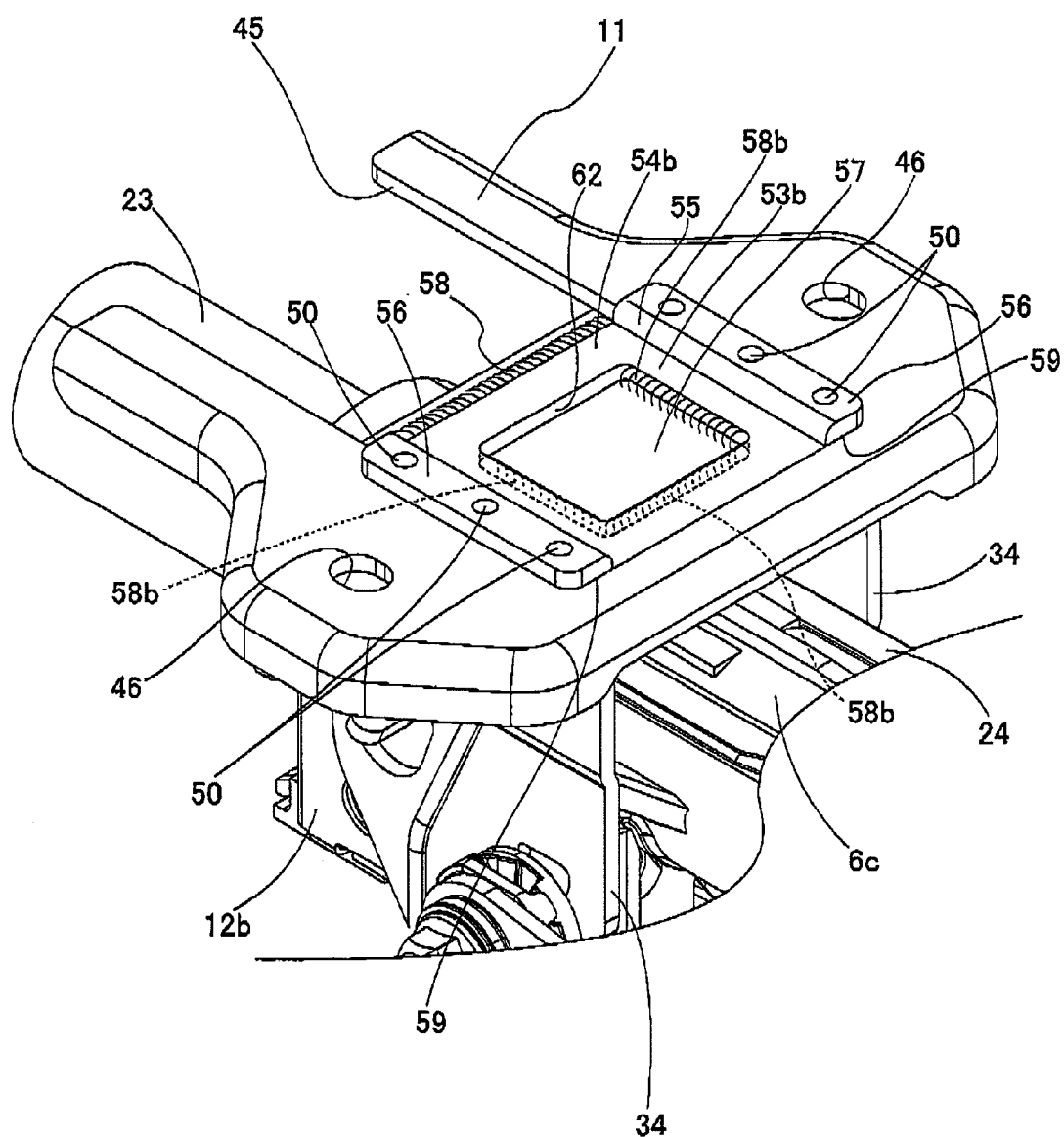
FIG. 11 is a drawing similar to FIG. 2, and illustrates a fourth example of an embodiment of the present invention.

FIG. 11 illustrates a fourth example of this embodiment of the present invention. In this example, welding 58b is performed between the edges on both the left and right sides and the edge on the rear end of the inner peripheral edge of a through hole 62, which is formed in the center section of the base plate section 54b of the locking capsule 53b, and the top surface of the top plate section 57. Moreover, welding 58 is also performed between the top surface of the front end of the top plate section 57 and the edge on the front end of the base plate section 54b in the same way as in the first example of the embodiment. However, welding is not performed between the edge on the rear end of the base plate section 54b and the top surface of the top plate section 57, and this edge on the rear end comes in contact with the edge on the back end of the locking hole 45 that is formed in the bracket 11 on the vehicle side. In the case of this kind of construction, because welding is not performed between the edge on the rear end of the base plate section 54b and the top surface of the top plate section 57, the direction of the welding torch does not need to be changed as much during the welding process of welding together the locking capsule 53b and the bracket 12b on the column side, so productivity is improved. The construction and functions of other parts, including the construction of the welded sections between the base plate sections 54b and the top plate section 57, are the same as in the third example of the embodiment, so any redundant explanations are omitted.

Fifth Example

Figure 12:
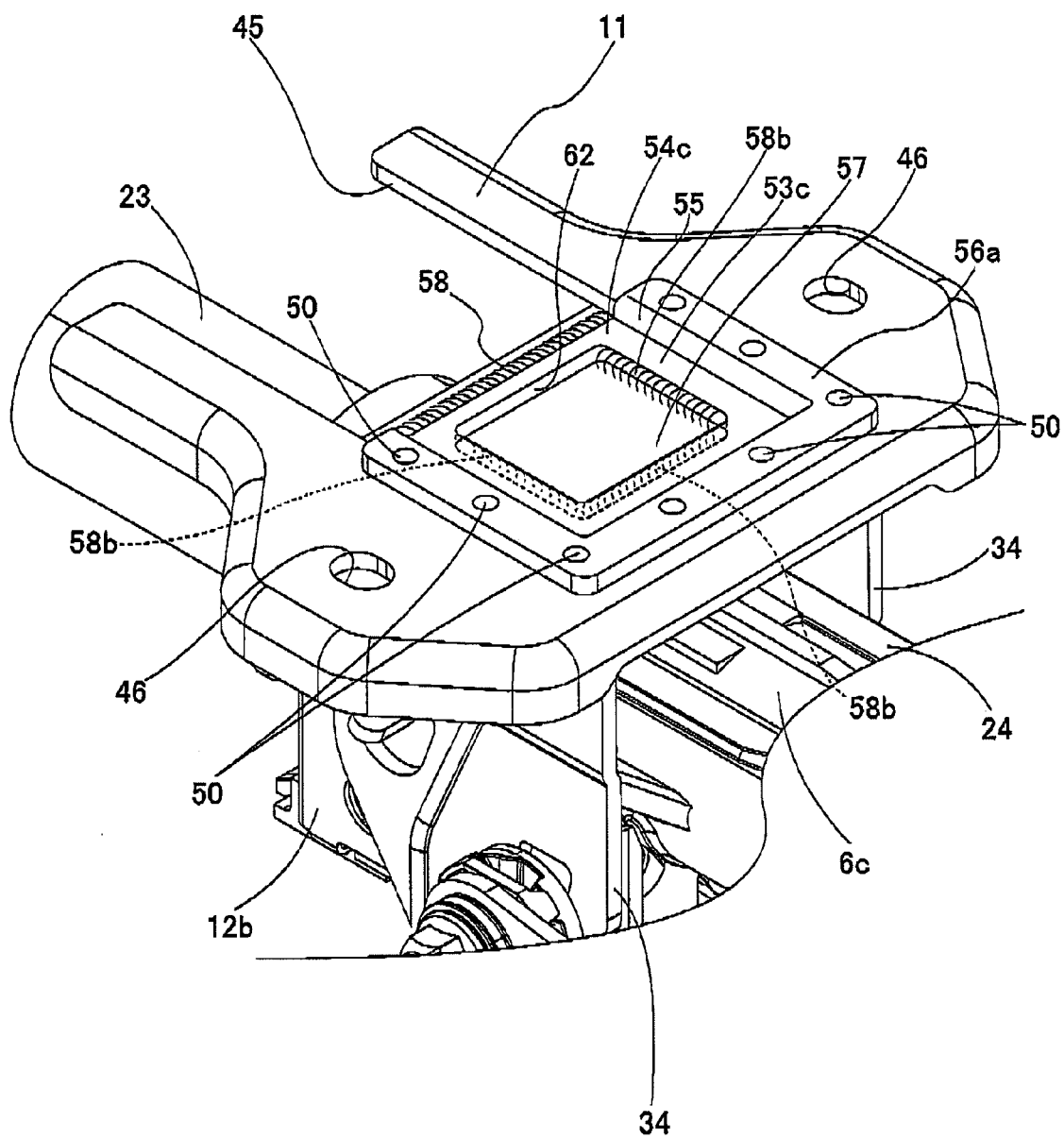
FIG. 12 is a drawing similar to FIG. 2, and illustrates a fifth example of an embodiment of the present invention.

FIG. 12 illustrates a fifth example of this embodiment of the present invention. In the case of this example, eave section 56a of the locking capsule 53c is formed on the rear end section in addition to both end sections in the width direction of the base plate section 54c. In addition to both end sections in the width direction of this eave section 56a, connecting pins 50 made of synthetic resin span between the rear end section and the bracket 11 on the vehicle side as well. In the case of the construction of this example, the locking capsule 53c is connected to the bracket 11 on the vehicle side along three sides, so it is easy to maintain the balance of the connecting and supporting force. The construction and functions of other parts are the same as in the fourth example, so any redundant explanations are omitted.

Sixth and Seventh Examples

Figure 13:
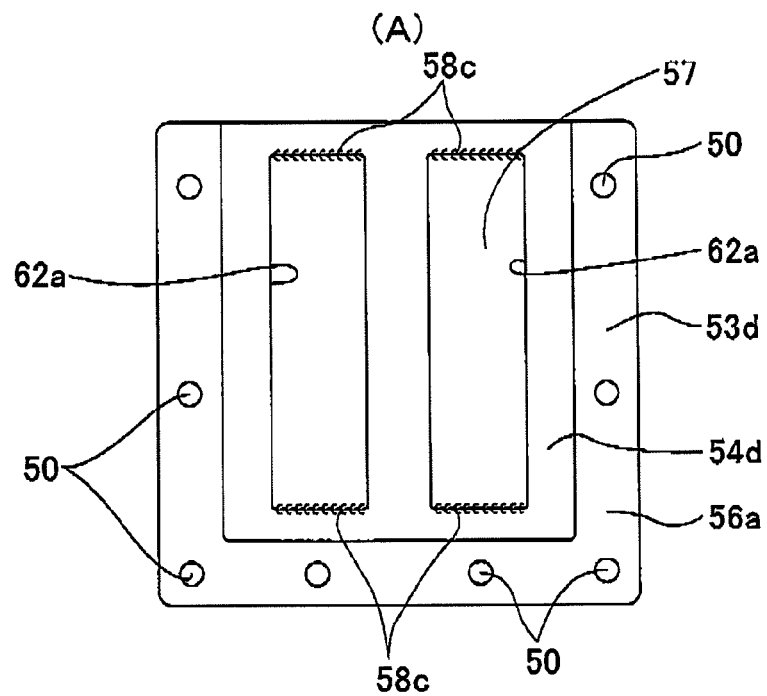
FIGS. 13A and 13B are partial top views illustrating two different examples of the shape of through holes form for improving the connecting strength in an embodiment of the present invention.
Figure 13:
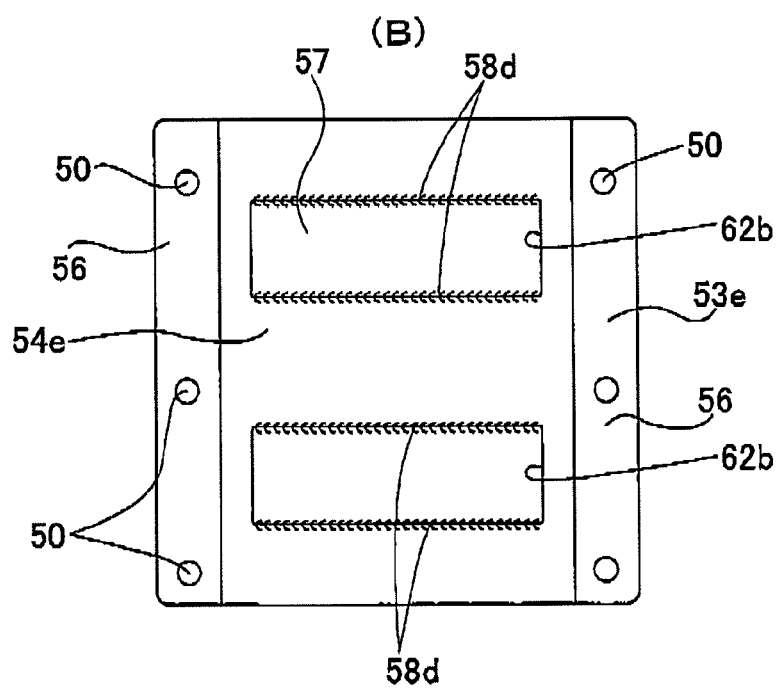

FIGS. 13A and 13B illustrate the locking capsules 53d, 53e that are used in the sixth and seventh examples of this embodiment. In the case of the third through fifth examples of this embodiment, a through hole 62 that was nearly square was formed in the base plate section of the locking capsule 53d, 53e. However, in the case of the sixth and seventh examples of the embodiment illustrated in FIGS. 13A and 13B, two rectangular through holes 62a, 62b are formed in the base plate section 54d, 54e of the locking capsule 53d, 53e. Of these, the locking capsule 53d, having the construction of the sixth example illustrated in FIG. 13A, has the same eave section 56a as in the construction of the fifth example. Through holes 62a that are long in the forward/backward direction are formed at two locations that are separated in the width direction of the base plate 54d. The locking capsule 53e, having the construction of the seventh example illustrated in FIG. 13B, has the same eave sections 56 as in the construction of the first example. Moreover, through holes 62b that are long in the width direction are formed at two locations that are separated in the forward/backward direction of the base plate section 54e. Furthermore, in either construction, welding 58c, 58d is performed between the both the front and rear end sections of the long holes 62a, 62b and the top plate section 57 of the bracket 12b on the column side. The positions of these welds 58c, 58d are not limited to the portions illustrated in the figures. Welding could also be performed along the edges on both the left and right sides of the long holes 62a, 6b, or could be performed around all edges. The construction and functions of other parts are the same as in the third through fifth examples of the embodiment, so any redundant drawings and explanations are omitted.

Example 8

FIG. 14 to FIG. 16E illustrate an eighth example of an embodiment of the present invention. The function and features of this example are construction wherein the locking capsule 53f and bracket 12c on the column side are both made of metal and are connected and fastened together by welding, and where there is not wedge shaped space between the outside surface of the pair of left and right raised sections 55 of the locking capsule 53f and the top surface of the top plate section 57 of the bracket 12c on the column side into which synthetic resin 67 enters as in the case illustrated in FIG. 6 of the first example of the embodiment. The construction and function of the other parts are the same as in the first example of this embodiment, so any redundant drawings and explanations are omitted.

In the case of the first example of this embodiment, connecting pins 50 were formed by injection molding using synthetic resin, and part of the synthetic resin was forced to enter into the space between the top and bottom surfaces of the bracket on the vehicle side and the bottom surface of the eave sections 56 and top surface of the top plate section 57. This in itself is preferred from the aspect of preventing vibration in the installation section of the bracket 12b on the column side to the bracket 11 on the vehicle side. However, as a secondary collision advances, there is a possibility that part of the synthetic resin will become a resistance to displacement in the forward direction of the locking capsule 53 and the bracket 12b on the column side with respect to the bracket 11 on the vehicle side.

Figure 18:
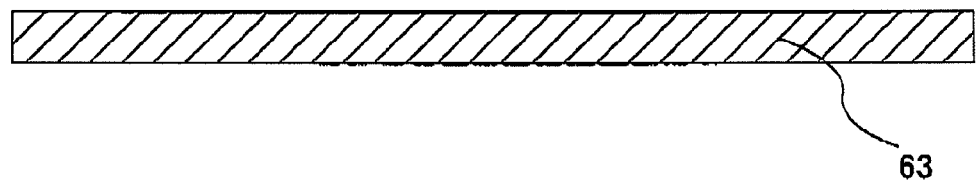
FIGS. 18A to 18C are cross-sectional views for comparison with the eighth example of an embodiment of the present invention, and illustrate the order of manufacturing processes for manufacturing the locking capsule that is assembled in the first example of an embodiment of the present invention.
Figure 18:
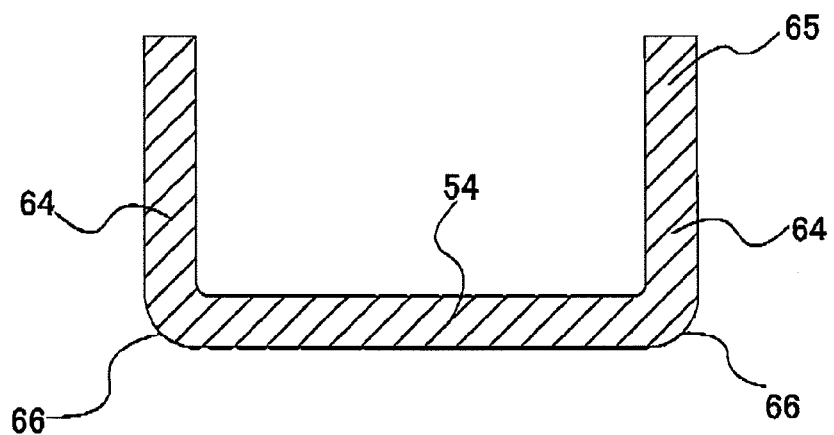
Figure 18:
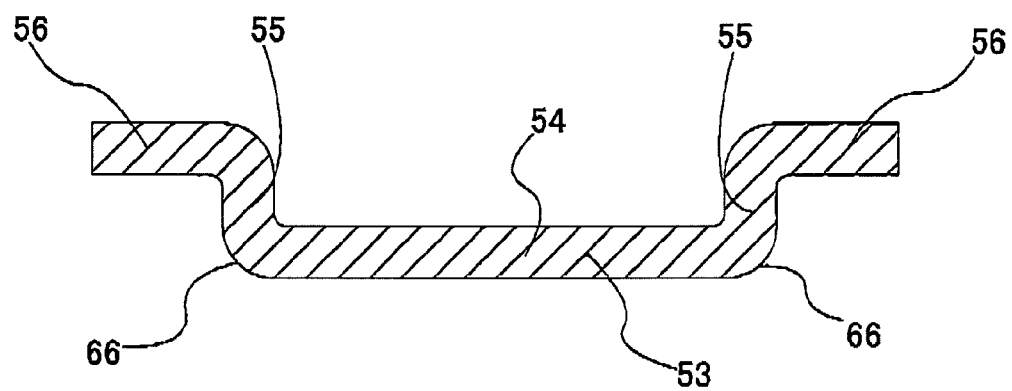

When manufacturing the locking capsule 53 of the first example of the embodiment, a bending process is performed on the metal plate 63, which is the raw material illustrated in FIG. 18A, in the order illustrated in FIG. 18A to FIG. 18C, to obtain the locking capsule 53 illustrated in FIG. 18C. In other words, the metal plate 63 that is illustrated in FIG. 18A is bent at two locations in the middle section, to obtain an intermediate raw material 65 comprising a base plate section 54 in the middle section and a pair of bent plate sections 64 that are bent from both end sections of the base plate section 54 at right angles in the same direction of the thickness of the raw material as illustrated in FIG. 18B. Next, these bent plate sections 64 are bent at portions near the base end in the middle section at right angles in opposite directions from each other to form eave sections 56, and to obtain the locking capsule 53 illustrated in FIG. 18C. A convex curved surfaces 66, having a quarter arc shaped cross sections, are formed in the continuous sections between the bottom surface of the base plate section 54 and the outside surfaces of the raised sections 55 of the locking capsule 53 that is obtained in this way.

Figure 19:
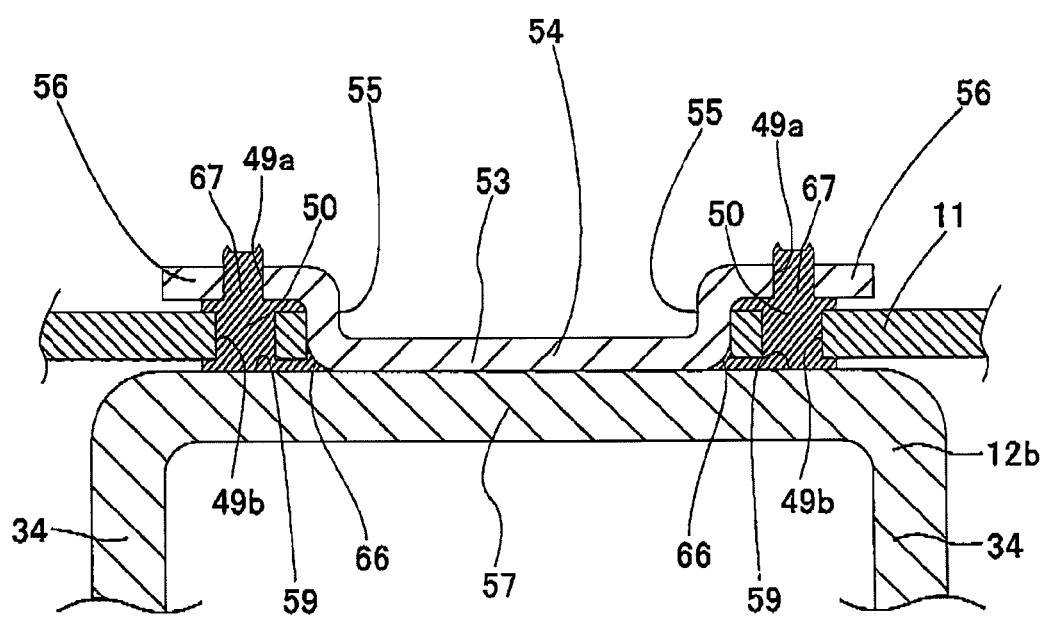
FIG. 19 is a drawing corresponding to FIG. 14, and illustrates the first example of an embodiment of the present invention for comparison with the eighth example of an embodiment of the present invention.
Figure 20:
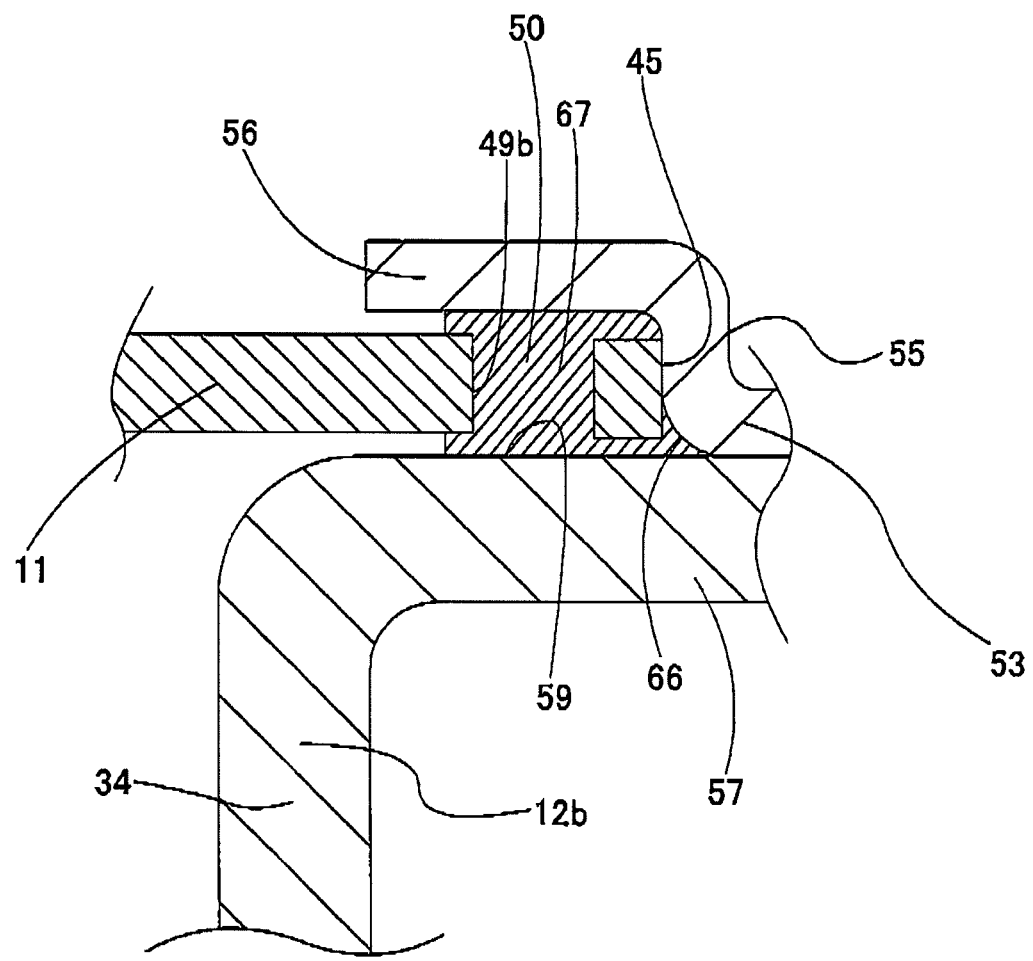
FIG. 20 is a drawing corresponding to the left section of FIG. 19, and illustrates the state after a secondary collision in the first example of the present invention for comparison with the eighth example of an embodiment of the present invention.

When the base plate section 54 of the locking capsule 53 is welded and fastened to the top plate section 57 of the bracket 12b on the column side, wedge shaped spaces are formed between the top surface of the top plate section 57 and the convex curved surfaces 66 as illustrated in FIG. 19 and FIG. 20. When injection molding to inject synthetic resin 67 to form connecting pins 50 for connecting the locking capsule 53 and bracket 12b on the column side to the bracket 11 on the vehicle side, part of the synthetic resin enters into these wedge shaped spaces and solidifies in these spaces.

Having part of the synthetic resin 67 solidify inside the wedge shaped spaces in itself is preferred from the aspect of preventing vibration in the connecting section of the locking capsule 53, bracket 12b on the column side and the bracket 11 on the vehicle side. However, the top surface of the top plate section 57 and the convex curved surfaces 66 that form the wedge shaped spaces come in contact with the synthetic resin that is solidified in these small spaces over a large surface area. The coefficient of friction at the area of rubbing between the synthetic resin 67 and the convex curved surfaces 66 of the locking capsule 53 and the top plate section of the bracket 12b on the column side that are both made of metal is low, however, this rubbing occurs over a large surface area, so it is not preferred from the aspect of lowering as much as possible the load (break away load) that is required to cause the locking capsule 53 and the bracket 12b on the column side to displace in the forward direction during a secondary collision. In other words, as illustrated in FIG. 20, the synthetic resin 67, which is solidified inside the space and that has a pointed shape on the tip end, remains adhered on the side of the bracket 11 on the vehicle side during a secondary collision, however, the locking capsule 53 and bracket 12b on the column side displace in the forward direction. When the locking capsule 53 and the bracket 12b on the column side displace in the forward direction with the synthetic resin 67 with the pointed tip end adhered as is inside the wedge shaped space, the friction at the area of rubbing become large. This is disadvantageous from the aspect of lowering and stabilizing the break away load, and protecting the driver.

Figure 16:
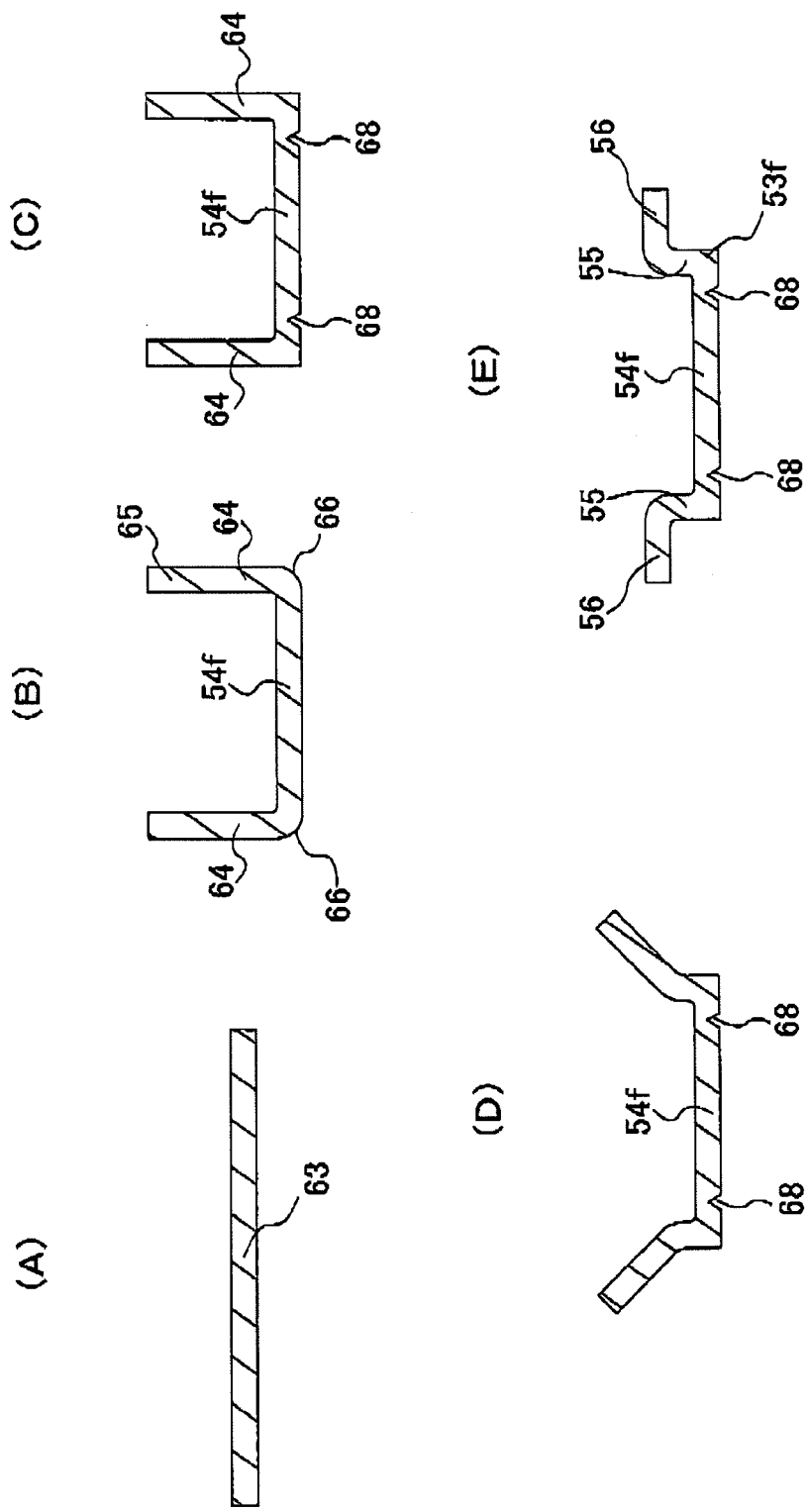
FIGS. 16A to 16E are cross-sectional views illustrating the order of manufacturing processes for manufacturing the locking capsule that is assembled in the eighth example of an embodiment of the present invention.

On the other hand, in this example, the continuous section between both the left and right end sections on the bottom surface of the base plate section 54f of the locking capsule 53f and the bottom end sections on the outside surfaces of the raised sections 55 have a pointed shape at a right angle. In other words, the curvature of the corner sections of this continuous section is as large as possible (the radius of curvature is as small as possible). The locking capsule 53f having a pointed continuous section is made as illustrated in FIG. 16.

First, the metal plate 63, which is the raw material illustrated in FIG. 16A, is bent at two locations in the middle section to obtain a first intermediate raw material 65 that comprises a base plate section 54f in the middle section, and a pair of bent plate sections 64 that are bent from both the left and right end sections of the base plate section 54f at right angles in the same direction of the thickness of the raw material. At this point, convex curved surfaces 66, having a partial cylindrical surface shape and having a quarter arc shaped cross section, exist in this first intermediate raw member 65 at the continuous sections between the outside surfaces of the bent plate sections 64 and the bottom surface of the base plate section 54f.

In order to eliminate these convex curved surfaces 66, the portions near both ends of the base plate section 54f are pressed in the direction of thickness as illustrated in FIG. 16C. More specifically, the intermediate raw material 65 is strongly pressed between a pair of dies that move from far to near in the up/down direction, to form a pair of concave grooves 68 that are continuous in the front/back direction in FIG. 16C in the portion near both ends on the bottom surface of the base plate section 54f. The metal material that is pressed out from the portions of these concave grooves 68 flows into the portions of the convex curved surfaces 66, causing the continuous sections between the outside surfaces of the bent plate sections 64 and the bottom plate sections 54f to become pointed at a right angle. Next, the portions near the base ends in the middle section of these bent plate sections are bent at right angles in opposite directions from each other, to form a pair of raised sections 55 and a pair of eave sections 56. In this example, the bending process for forming these raised sections 55 and eave sections 56 is performed in two steps. In other words, first, as illustrated in FIG. 16D, the portions near the base end in the middle sections of the bent plate sections 64 are bent about half way (45 degrees), and then these portions are bent the remaining half to form a pair of left and right eave sections 56, and to obtain the locking capsule 53f illustrated in FIG. 16E. By performing the processing described above, a locking capsule 53f, of which the continuous sections between the both the left and right end sections of the bottom surface of the base plate section 54f and the outside surfaces of the raised sections 55 are pointed, are easily obtained by performing an industrial feasible bending process of a metal plate raw material.

Figure 14:
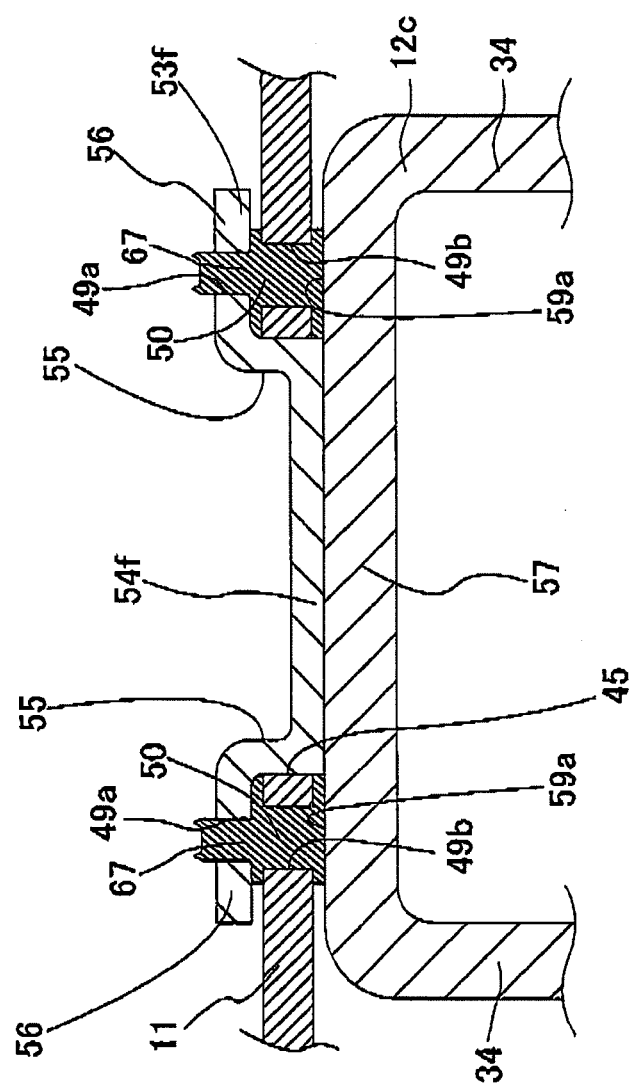
FIG. 14 is a drawing illustrating an eighth example of an embodiment of the present invention, and corresponds to a cross-sectional view of section A-A in FIG. 5.
Figure 15:
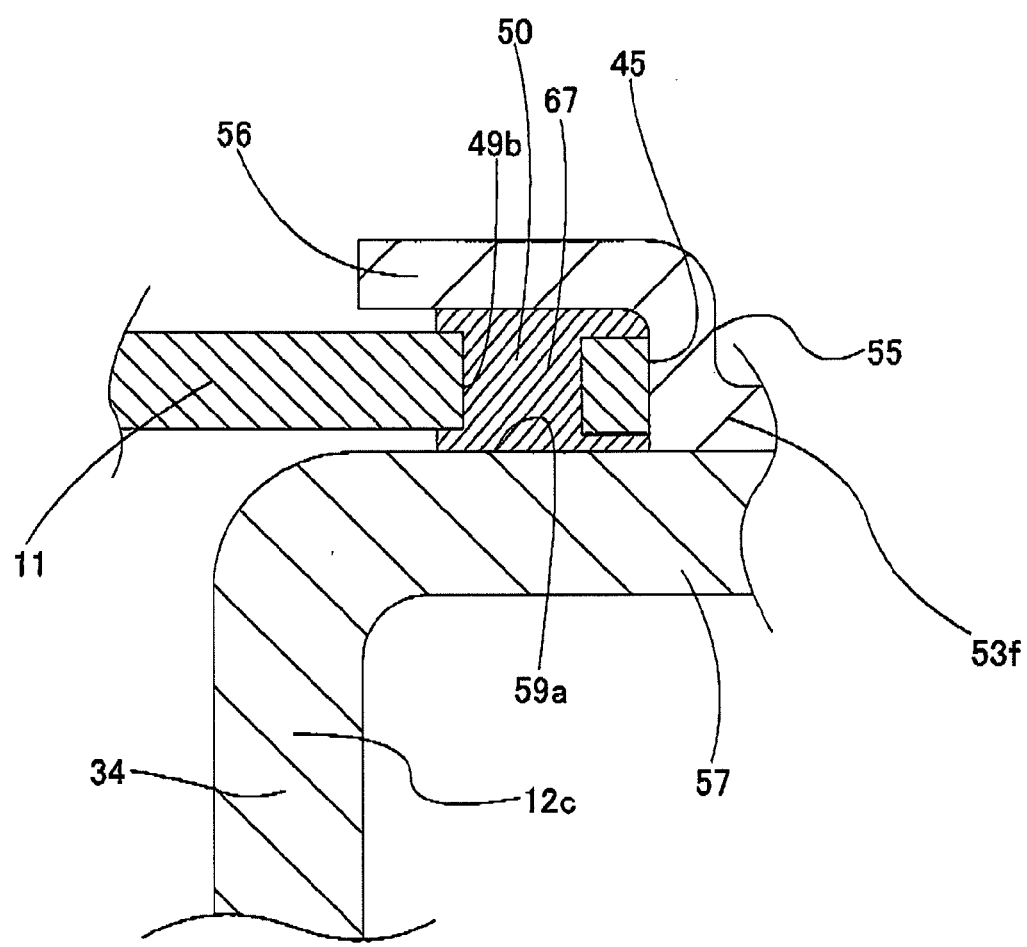
FIG. 15 is a drawing illustrating the state after a secondary collision in an eighth example of an embodiment of the present invention, and corresponds to the left section in FIG. 14.

In this example, the continuous sections between both the left and right end sections of the bottom surface of the base plate section 54f and the bottom end sections of the outside surfaces of the raised sections 55 of the locking plate 53f are pointed. Therefore, even when the locking capsule 53f and the bracket 12c on the column side are connected and fastened together, wedge shaped spaces such as illustrated in FIG. 19 and FIG. 20 are not formed in the portions that correspond to these continuous sections. Consequently, there is no problem with the break away force required for causing the locking capsule 53f and bracket 12c on the column side to displace in the forward direction during a secondary collision becoming large or unstable when the synthetic resin 67 enters into wedge shaped spaces. Therefore, even when synthetic resin 67 enters in between the top and bottom surfaces of the bracket 11 on the vehicle side and the bottom surface of the eave sections 56 of the locking capsule 53f and the top surface of the bracket 12c on the column side as illustrated in FIG. 14 and FIG. 15 in order to prevent vibration in the connecting section between the bracket 11 on the vehicle side and the locking capsule 53f, it is possible to lower and stabilize the break away load.

Ninth to Twelfth Examples

FIGS. 17A to 17D illustrate ninth through twelfth examples of this embodiment of the present invention. In these examples, the pressed shapes of the portions near both ends of the base plate section 54f for making the continuous sections between both the left and right end sections on the bottom surface of the base plate section 54f of the locking capsule 53f and the bottom end sections on the outside surfaces of the pair of left and right raised sections 55 pointed shapes are different.

Figure 17:
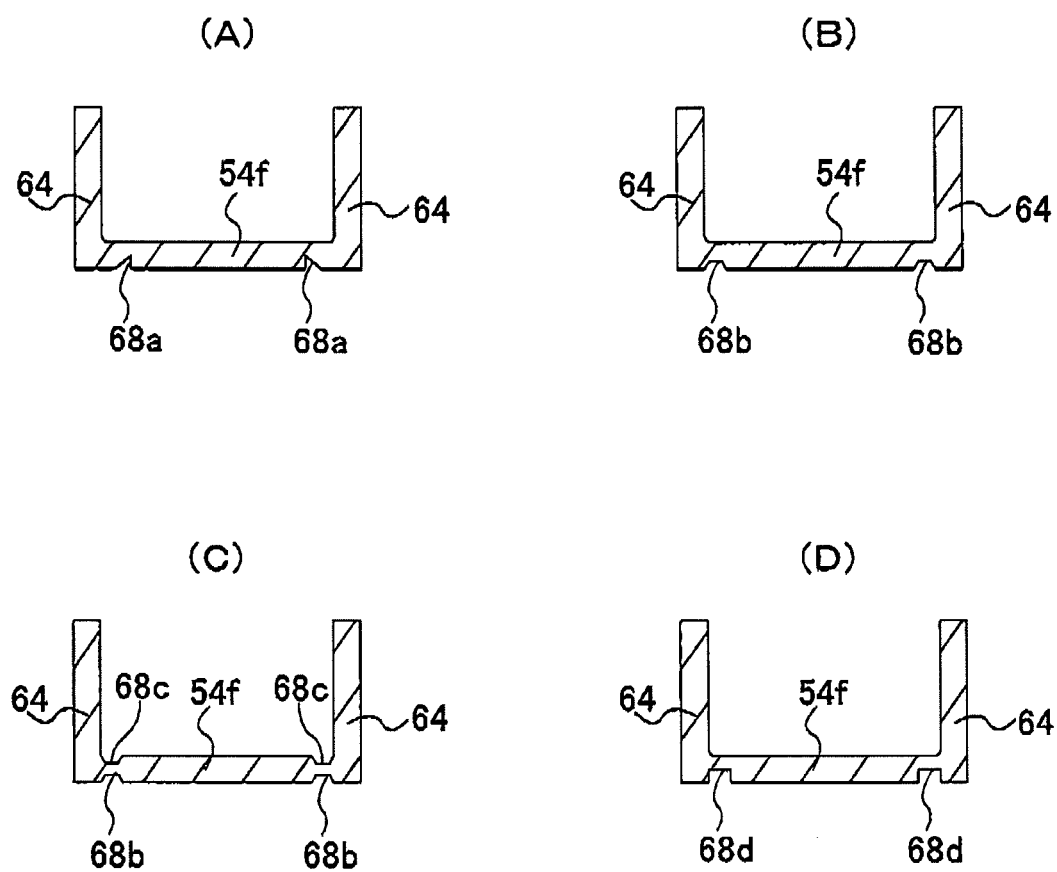
FIGS. 17A to 17D are cross-sectional views corresponding to FIG. 16C, and illustrate four different examples of the manufacturing method for a locking capsule in an embodiment of the present invention.

First, in the case of the construction of the ninth example illustrated in FIG. 17A, grooves 68a having a right triangle shaped cross section are formed in the portions near both ends on the bottom surface of the base plate section 54f. Moreover, in the case of the construction of the tenth example illustrated in FIG. 17B, grooves 68b having a trapezoidal shaped cross section are formed in the portions near both ends on the bottom surface of the base plate section 54f. Furthermore, in the case of the construction of the eleventh example illustrated in FIG. 17C, grooves 68b, 68c having a trapezoidal shaped cross section are formed in the portions near both ends on both the top and bottom surfaces of the base plate section 54f. Finally, in the case of the construction of the twelfth example illustrated in FIG. 17D, grooves 682 having a rectangular shaped cross section are formed in the portions near both ends on the bottom surface of the base plate section 54f. The construction and functions of other parts are the same as in the eighth example, so explanations of identical parts are omitted.

INDUSTRIAL APPLICABILITY

The case of applying the present invention to a steering column support apparatus that comprises both a tilt mechanism for adjusting the up/down position of a steering wheel, and a telescopic mechanism for adjusting the forward/backward position of the steering wheel was explained. However, the present invention can also be applied to a steering column support apparatus having only a tilt mechanism or only a telescopic mechanism, or to a fixed steering wheel type steering column support apparatus having neither of these mechanisms.

EXPLANATION OF REFERENCE NUMBERS

| | |
|---|---|
| 1 | Steering wheel |
| 2 | Steering gear unit |
| 3 | Input shaft |
| 4 | Tie rod |
| 5, 5a, 5b | Steering shaft |
| 6, 6a, 6b, 6c | Steering column |
| 7 | Universal joint |
| 8 | Intermediate shaft |
| 9 | Universal joint |
| 10, 10a | Housing |
| 11, 11a | Bracket on the vehicle side |
| 12, 12a, 12b, 12c | Bracket on the column side |
| 13 | Bracket on the housing side |
| 14a, 14b | Installation plate section |
| 15a, 15b | Cutout section |
| 16a, 16b | Sliding plate |
| 17 | Energy absorbing member |
| 18 | Locking notch |
| 19 | Locking capsule |
| 20 | Locking groove |
| 21a, 21b | Small locking hole |
| 22 | Locking pin |
| 23 | Inner column |
| 24 | Outer column |
| 25 | Outer shaft |
| 26 | Ball bearing |
| 27 | Electric motor |
| 28 | Controller |
| 29 | Support cylinder |
| 30 | Center hole |
| 31 | Slit |
| 32 | Long hole in the circumferential direction |
| 33 | Supported plate section |
| 34 | Support plate section |
| 35 | Long hole in the up/down direction |
| 36 | Long hole in the forward/backward direction |
| 37 | Adjustment rod |
| 38 | Head section |
| 39 | Nut |
| 40 | Driving cam |
| 41 | Driven cam |
| 42 | Cam apparatus |
| 43 | Adjustment lever |
| 44 | Friction plate unit |
| 45 | Locking hole |
| 46 | Installation hole |
| 47 | Locking capsule |
| 48 | Flange section |
| 49a, 49b | Small through hole |
| 50 | Connecting pin |
| 51 | Bolt |
| 52 | Nut |
| 53, 53a, 53b, 53c, 53d, 53e, 53f | Locking capsule |
| 54, 54a, 54b, 54c, 54d, 54e, 54f | Base plate section |
| 55 | Raised section |
| 56, 56a | Eave section |
| 57, 57a | Top plate section |
| 58, 58a, 58b, 58c, 58d | Weld |
| 59, 59a | Locking groove |
| 60 | Notch |
| 61 | Bent back section |
| 62, 62a, 62b | Through hole |
| 63 | Metal plate |
| 64 | Bent plate section |
| 65 | First intermediate raw material |
| 66 | Convex curved surface |
| 67 | Synthetic resin |
| 68, 68a, 68b, 68c, 68d | Concave groove |

What is claimed is:

1. A steering column support apparatus, comprising:
a bracket on the vehicle side having a locking hole that extends in the axial direction of a steering column and that is located in the center section in the width direction of the bracket, this bracket on the vehicle side being fastened to the vehicle so as not to displace in the forward direction during a secondary collision;
a bracket on the column side that is supported by the steering column and comprises a top plate section on the top end section thereof and
a locking capsule that is fastened to the bracket on the column side and is locked in the locking hole of the bracket on the vehicle side,
the bracket on the column side being supported by the bracket on the vehicle side by way of the locking capsule so as to be able to break away in the forward direction due to an impact load that is applied during a secondary collision,
the bracket on the column side and the locking capsule being both made of metal plate that can be welded,
the locking capsule comprising: a base plate section that is fastened to a top surface of the top plate section of the bracket on the column side by welding with this base plate section overlapping with the top plate section; a pair of raised sections that are bent and extend upward from both end sections in the width direction of the base plate section; and at least a pair of eave sections that are bent and extend in opposite directions from each other from the top ends of the raised sections, and
the portion of the bracket on the vehicle side on both sides of the locking hole fitting between the top surface of the bracket on the column side and the bottom surface of the eave sections.

2. The steering column support apparatus according to claim 1, wherein
the dimension in the forward/backward direction of the base plate section is equal to or less than the dimension in the forward/backward direction of the portion of the top plate section of the bracket on the column side that overlaps with the base plate section; and
the end edges in the forward/backward direction of the base plate and the top surface or the end edges in the forward/backward direction of the top plate section are joined by fillet welding.

3. The steering column support apparatus according to claim 1, wherein
bent back sections, which are formed by bending back the end sections in the forward/backward direction of the base plate section, wrap around the end sections in the forward/backward direction of the portions of the top plate section of the bracket on the column side that overlap with the base plate section; and
the locking capsule is fastened to the bracket on the column side by engaging these bent back sections with the end sections in the forward/backward direction of the top plate section in addition to welding together the top plate section and the base plate section.

4. The steering column support apparatus according to claim 1, wherein
a through hole is formed in a portion of the base plate section; and
at least part of the inner peripheral edge of the through hole are the top surface of the top plate section are joined by welding.

5. The steering column support apparatus according to claim 1, wherein the length in the forward/backward direction of the locking hole is longer than the length in the same direction of the locking capsule, and is long enough that even when the locking capsule has displaced together with the steering column in the forward direction during a secondary collision, at least the rear end sections of the eave sections of the locking capsule are located on the top side of the front end section of the bracket on the vehicle side, making it possible to prevent the locking capsule from dropping down.

6. The steering column support apparatus according to claim 1, wherein a plurality of small through holes are formed in portions of the bracket on the vehicle side on both sides of the locking hole, and in portions of the eave sections of the locking capsule that are aligned with each other;

connecting pins made of synthetic resin are formed by performing injection molding of injecting molten resin in the aligned small through holes such that these connecting pins span between these small through holes; and together with the locking capsule being connected to the bracket on the vehicle side by the connecting pins, part of the synthetic resin of the connecting pins penetrates into at least part of a space that exists between the top and bottom surfaces of the bracket on the vehicle side and the opposing surfaces to these surfaces, preventing vibration in the space between these surfaces.

7. The steering column support apparatus according to claim 6, wherein connecting sections between both end sections on the bottom surface of the base plate section and the bottom end sections on the outside surfaces of the raised sections have a pointed shape.

* * * * *